US012253059B2

(12) United States Patent
Rabaut et al.

(10) Patent No.: US 12,253,059 B2
(45) Date of Patent: Mar. 18, 2025

(54) DEVICE AND METHOD FOR PLACING A COMPONENT OF A WIND TURBINE

(71) Applicant: DEME Offshore BE NV, Zwijndrecht (BE)

(72) Inventors: Dieter Wim Jan Rabaut, Ghent (BE); Victor Hanenburg, Rotterdam (NL)

(73) Assignee: DEME Offshore BE NV, Zwijndrecht (BE)

( * ) Notice: Subject to any disclaimer, the term of this patent is extended or adjusted under 35 U.S.C. 154(b) by 0 days.

(21) Appl. No.: 18/018,069

(22) PCT Filed: Jul. 26, 2021

(86) PCT No.: PCT/EP2021/070876
§ 371 (c)(1),
(2) Date: Jan. 26, 2023

(87) PCT Pub. No.: WO2022/023279
PCT Pub. Date: Feb. 3, 2022

(65) Prior Publication Data
US 2023/0258157 A1 Aug. 17, 2023

(30) Foreign Application Priority Data
Jul. 27, 2020 (BE) .................................. 2020/5550

(51) Int. Cl.
*F03D 13/10* (2016.01)
*B66C 1/10* (2006.01)
*B66C 13/08* (2006.01)

(52) U.S. Cl.
CPC .............. *F03D 13/10* (2016.05); *B66C 1/108* (2013.01); *B66C 13/08* (2013.01)

(58) Field of Classification Search
CPC ..... F05B 2240/90; B66C 1/108; B66C 13/08; F03D 13/10
See application file for complete search history.

(56) References Cited

U.S. PATENT DOCUMENTS

| 2008/0078128 A1 | 4/2008 | Livingston et al. |
| 2018/0155160 A1 | 6/2018 | Nelson et al. |

FOREIGN PATENT DOCUMENTS

| EP | 2623768 A1 | 8/2013 |
| WO | 2008132226 A1 | 11/2008 |
| WO | 2011082710 A1 | 7/2011 |
| WO | 2011099916 A1 | 8/2011 |
| WO | 2019245366 A1 | 12/2019 |
| WO | 2022023279 A1 | 2/2022 |

OTHER PUBLICATIONS

Erigovis, "Erigolift", YouTube—Mar. 19, 2013, https://youtu.be/xsSP2FXfogk?si=4bO7TWb0LIORDza9.

*Primary Examiner* — Moshe Wilensky
(74) *Attorney, Agent, or Firm* — The Webb Law Firm

(57) ABSTRACT

Described is a device for placing a component of a wind turbine on a wind turbine tower. The device includes a hoisting means with a hoisting cable for taking up the component. A positioning tool is connected to the hoisting cable by means of an intermediately arranged intermediate construction which forms part of the positioning tool. A guide frame of the positioning tool is connected on one side to the intermediate construction and is provided on another side with engaging means for engaging a peripheral part of the wind turbine tower. The invention likewise relates to a method which makes use of the invented device.

20 Claims, 27 Drawing Sheets

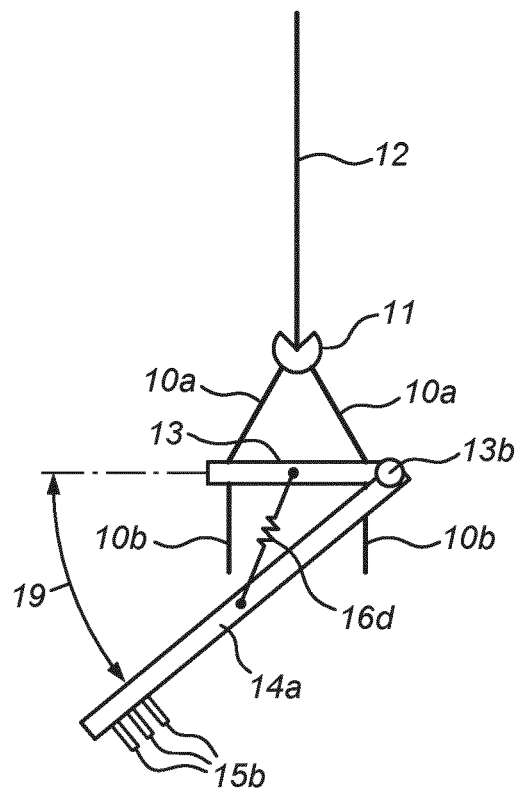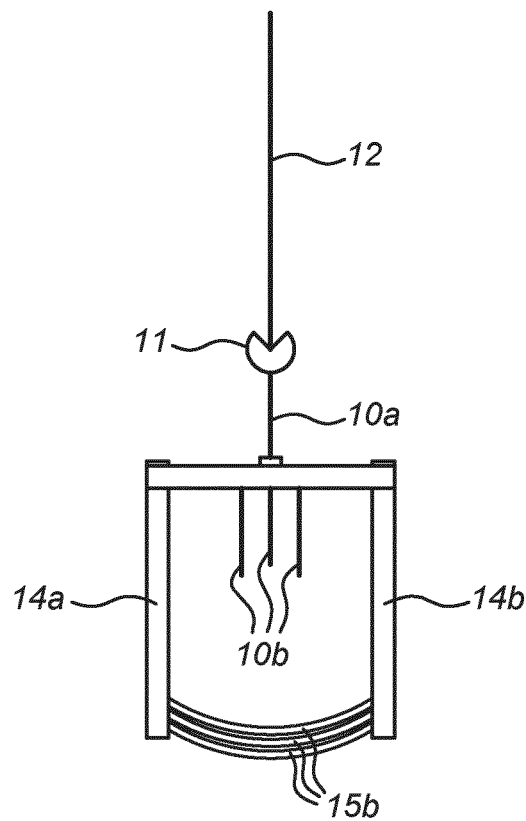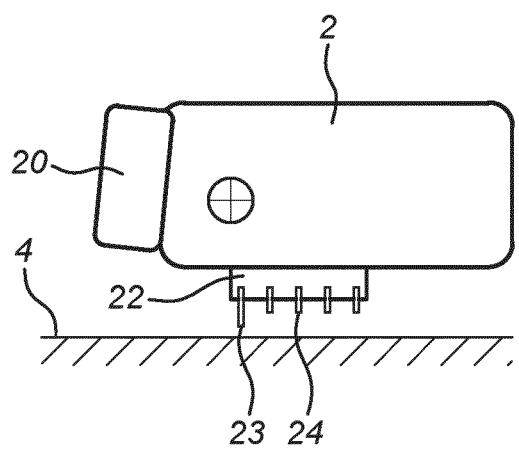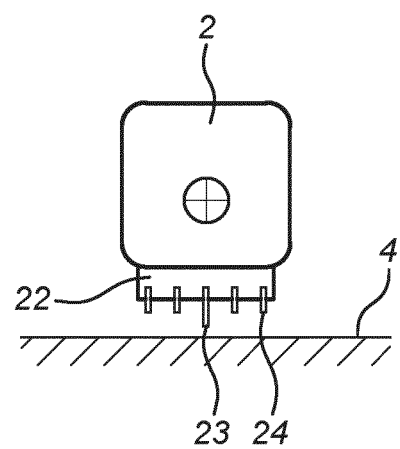
Fig. 3A  Fig. 3B

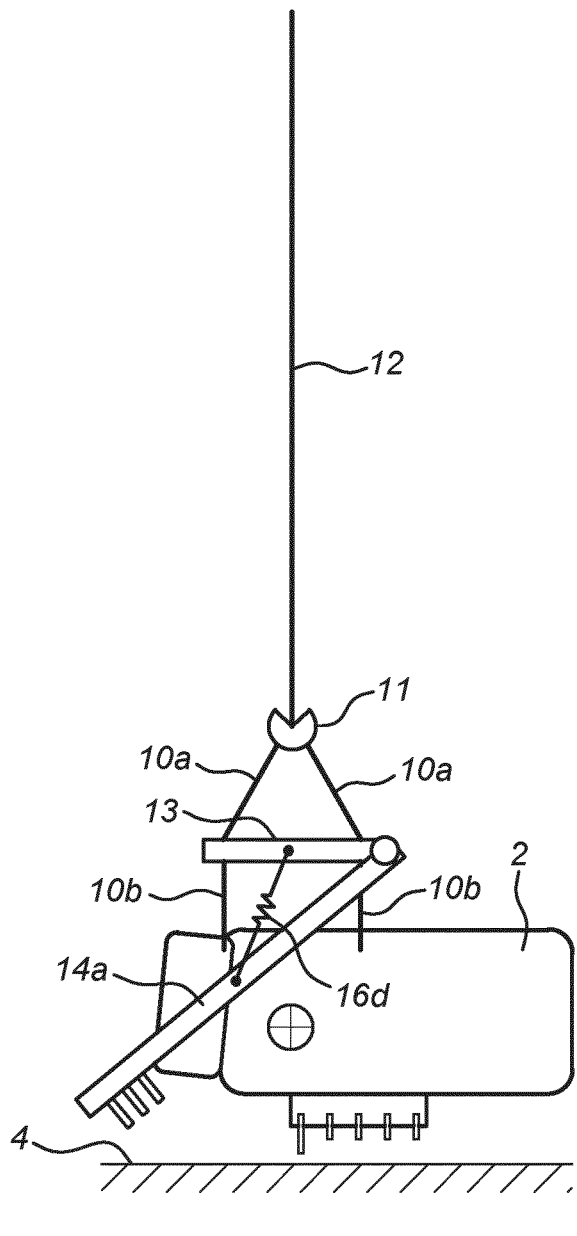
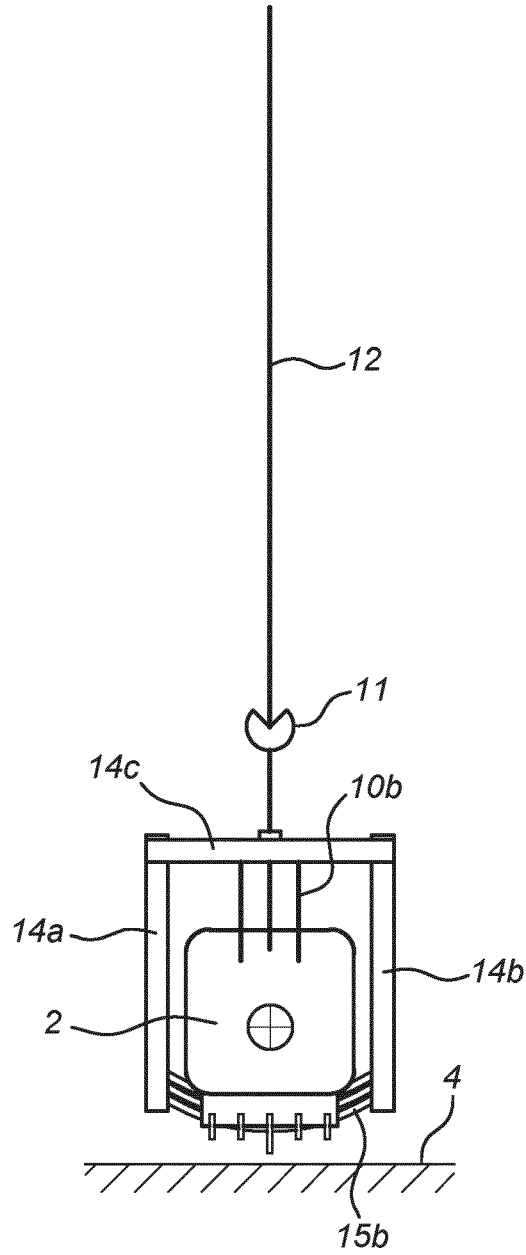
Fig. 4A
Fig. 4B

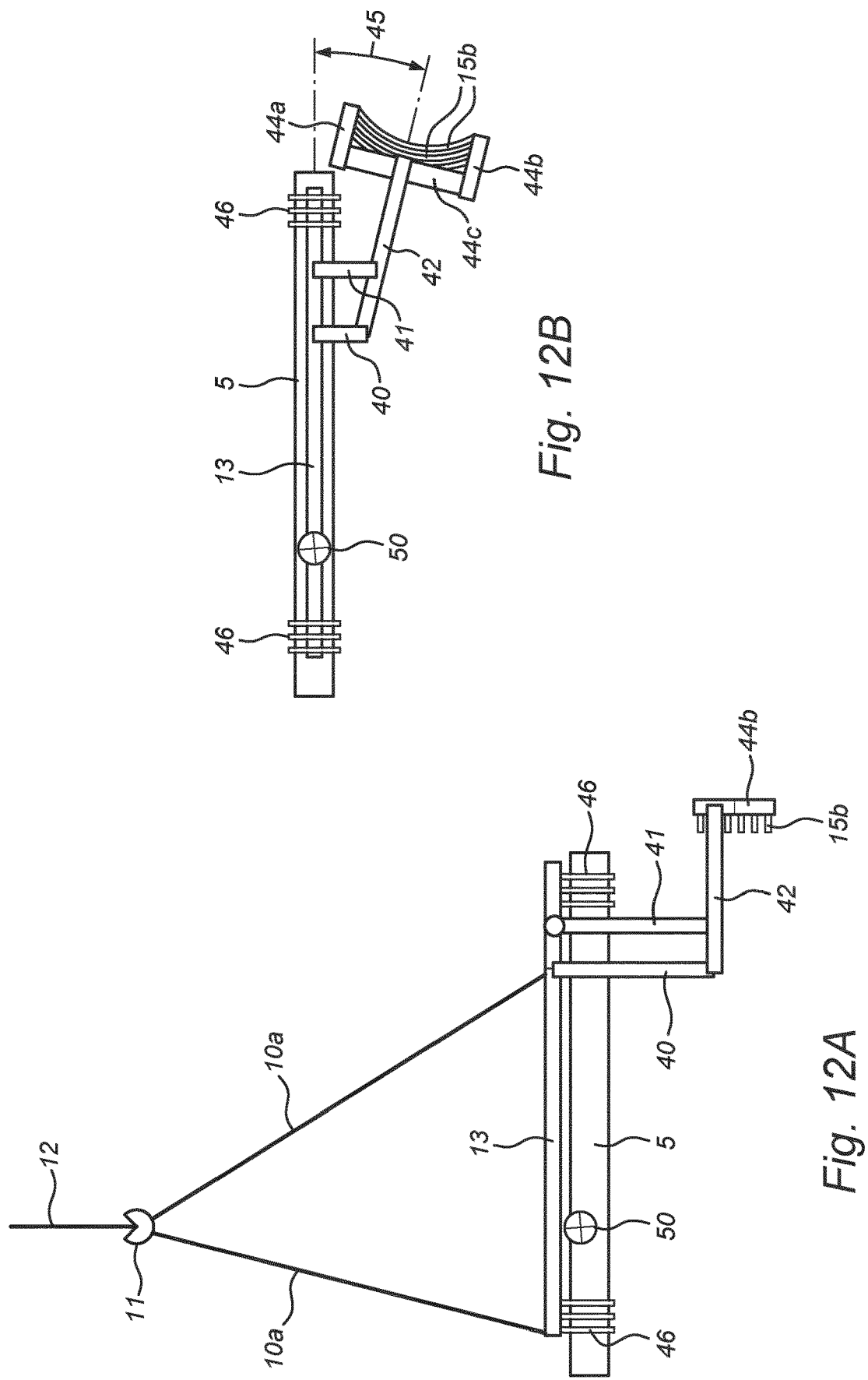

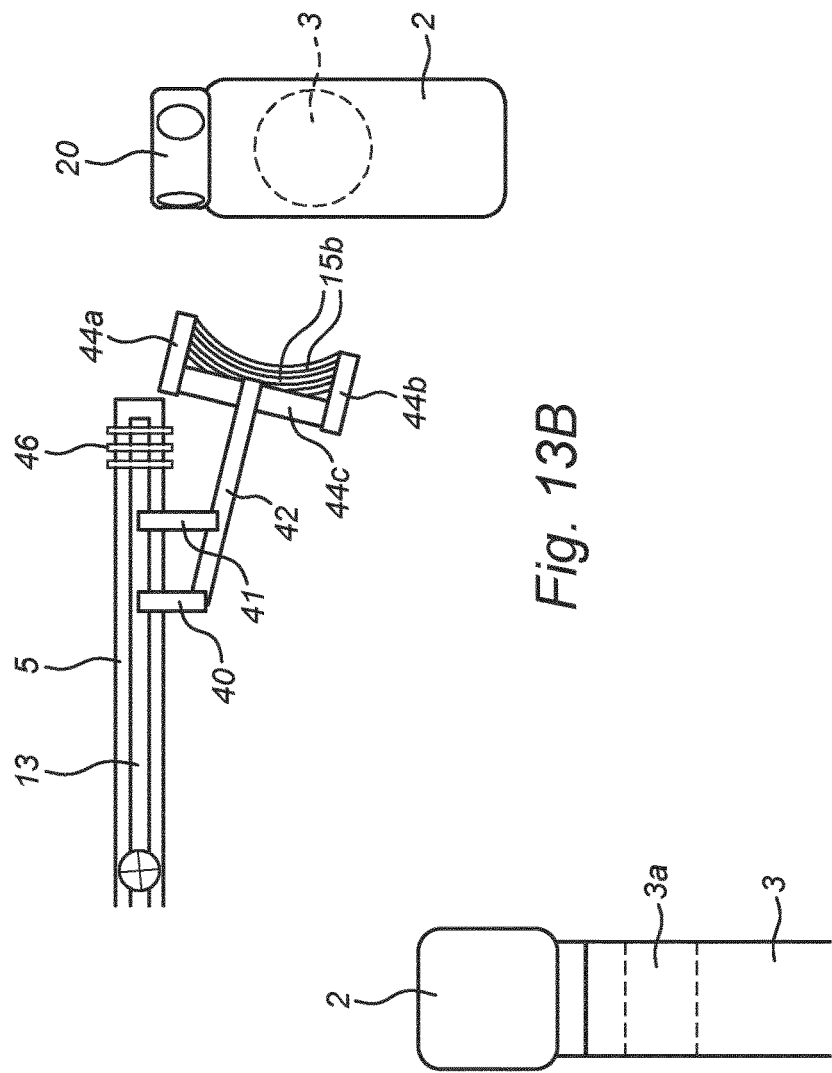
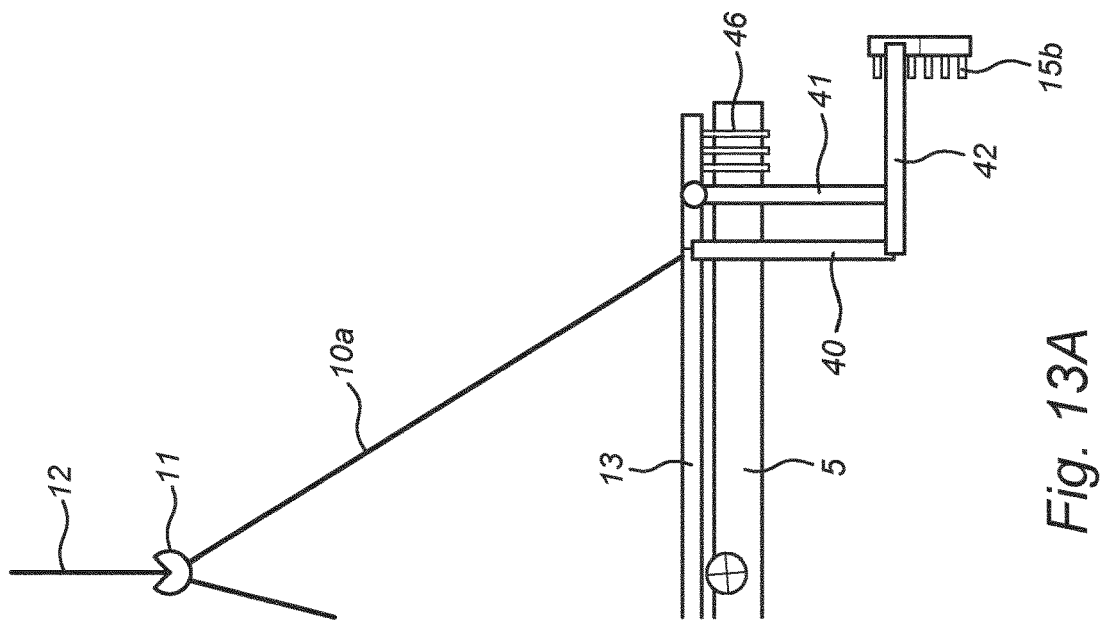
Fig. 13B
Fig. 13A

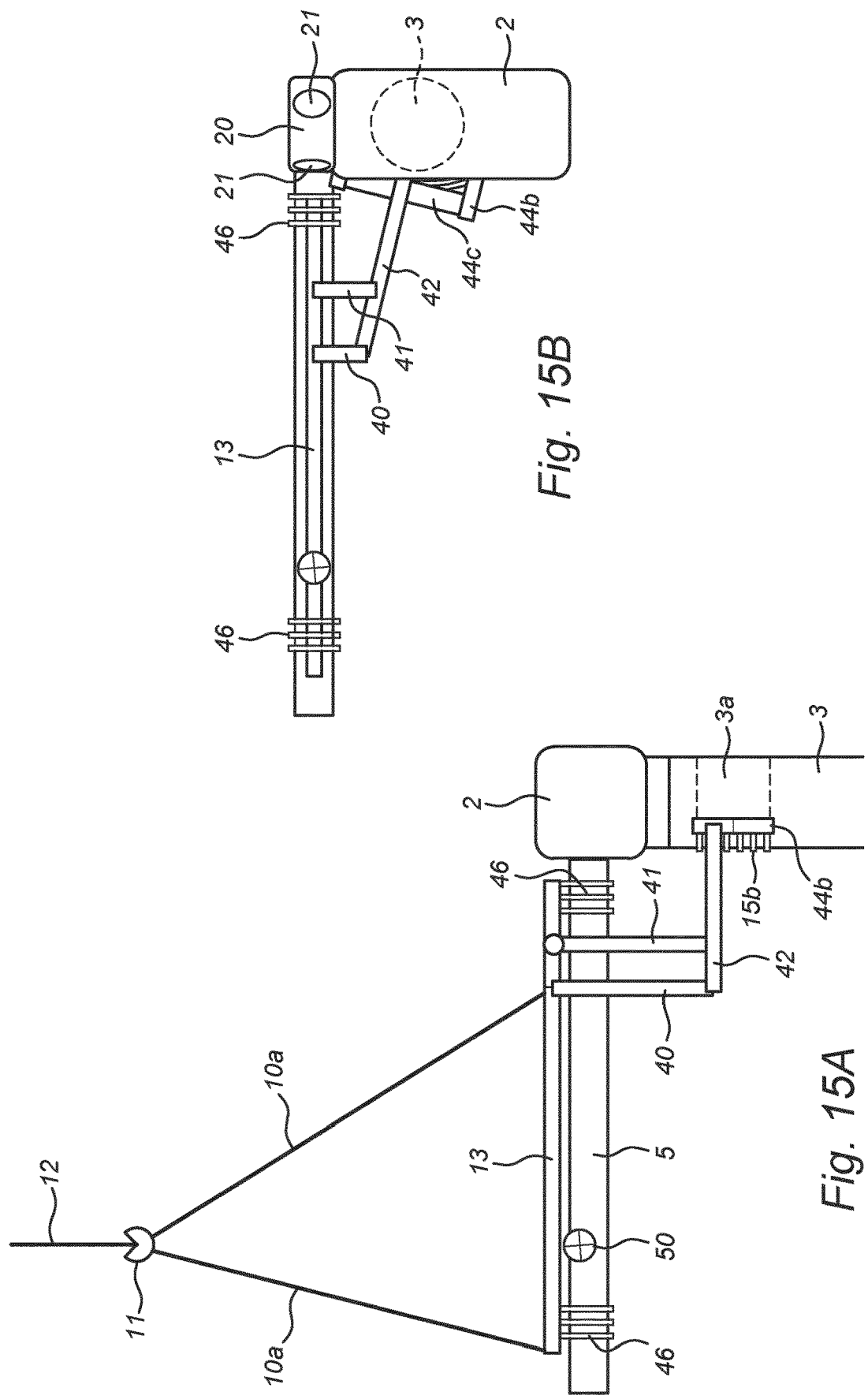

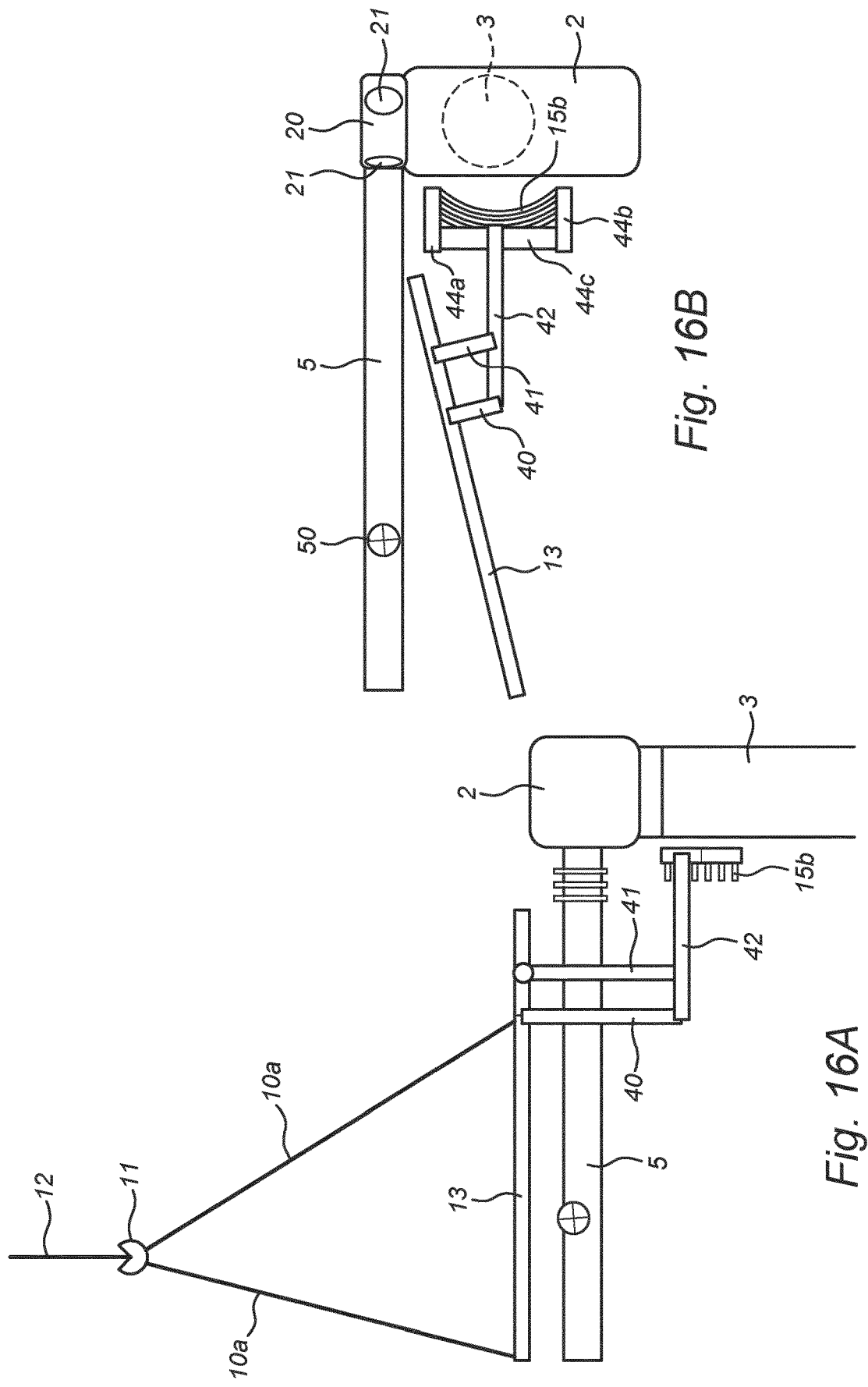

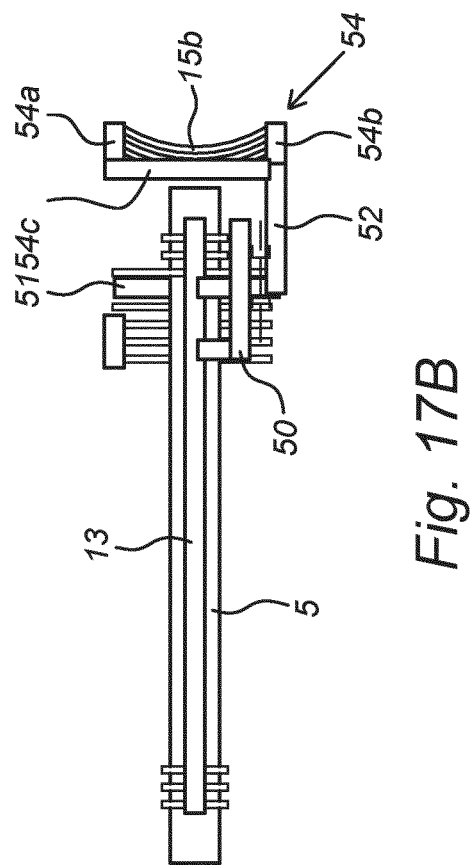
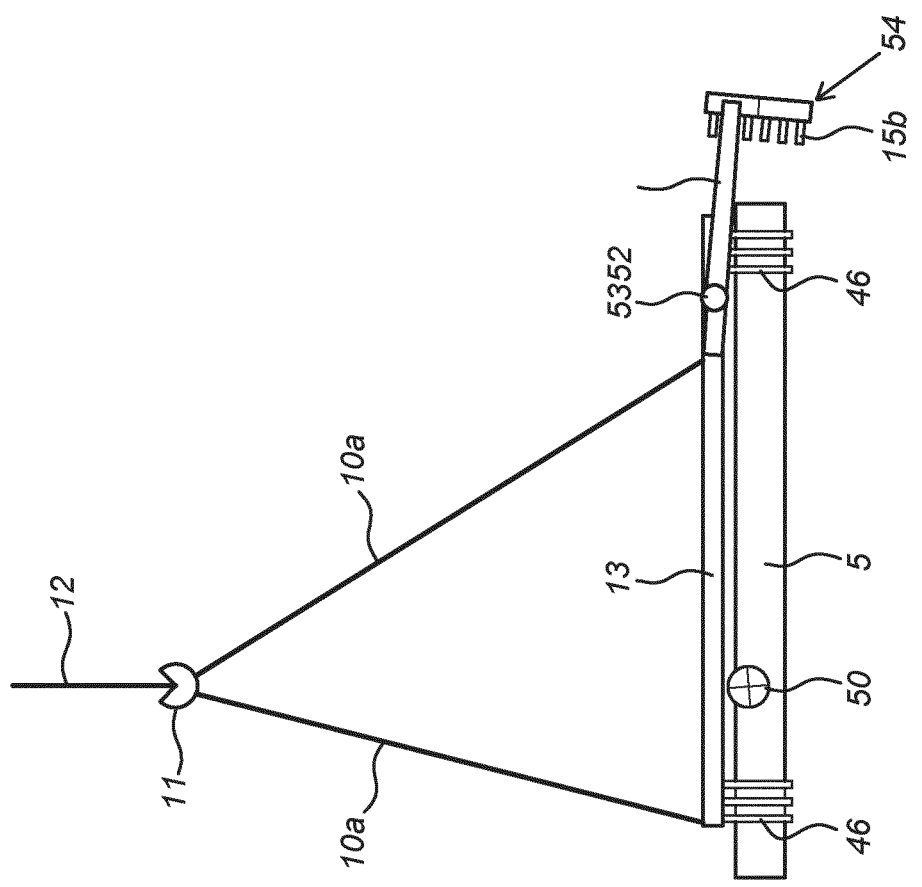
Fig. 17B
Fig. 17A

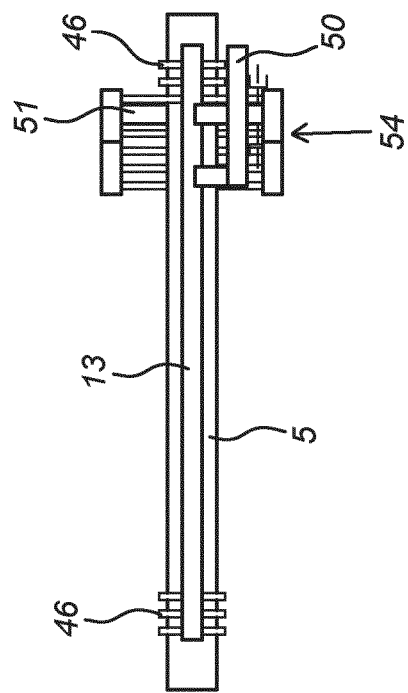
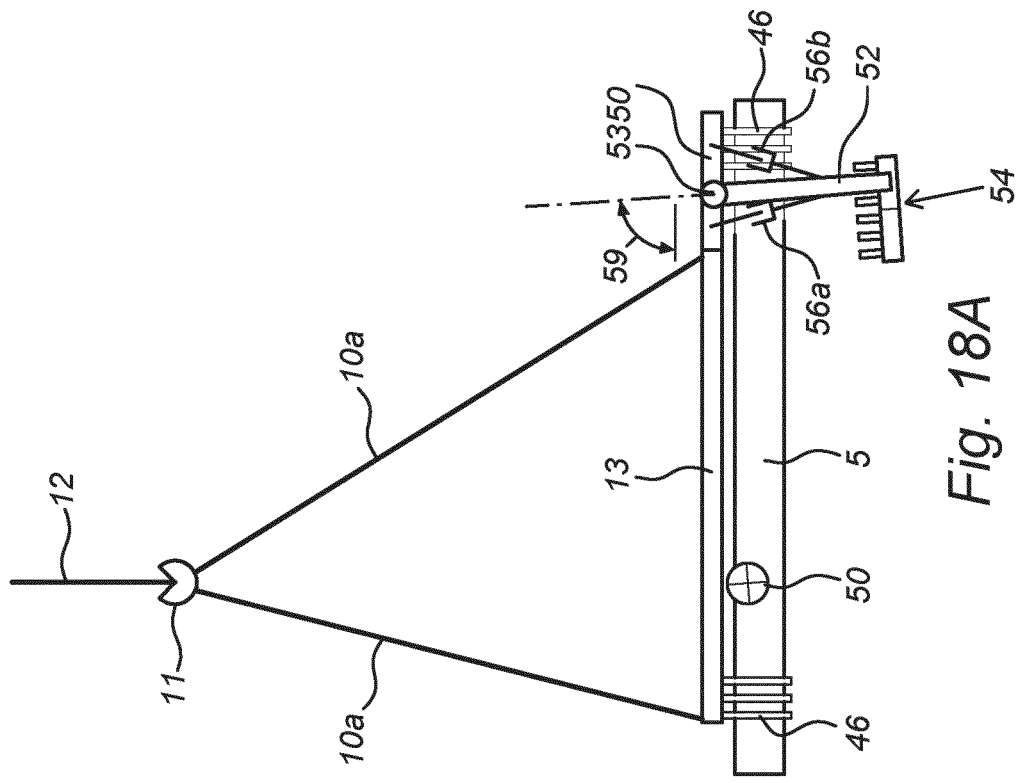

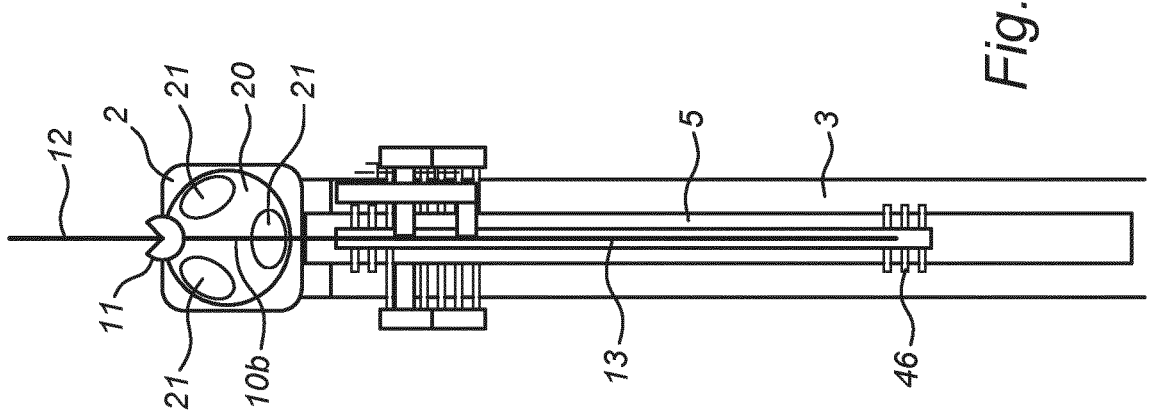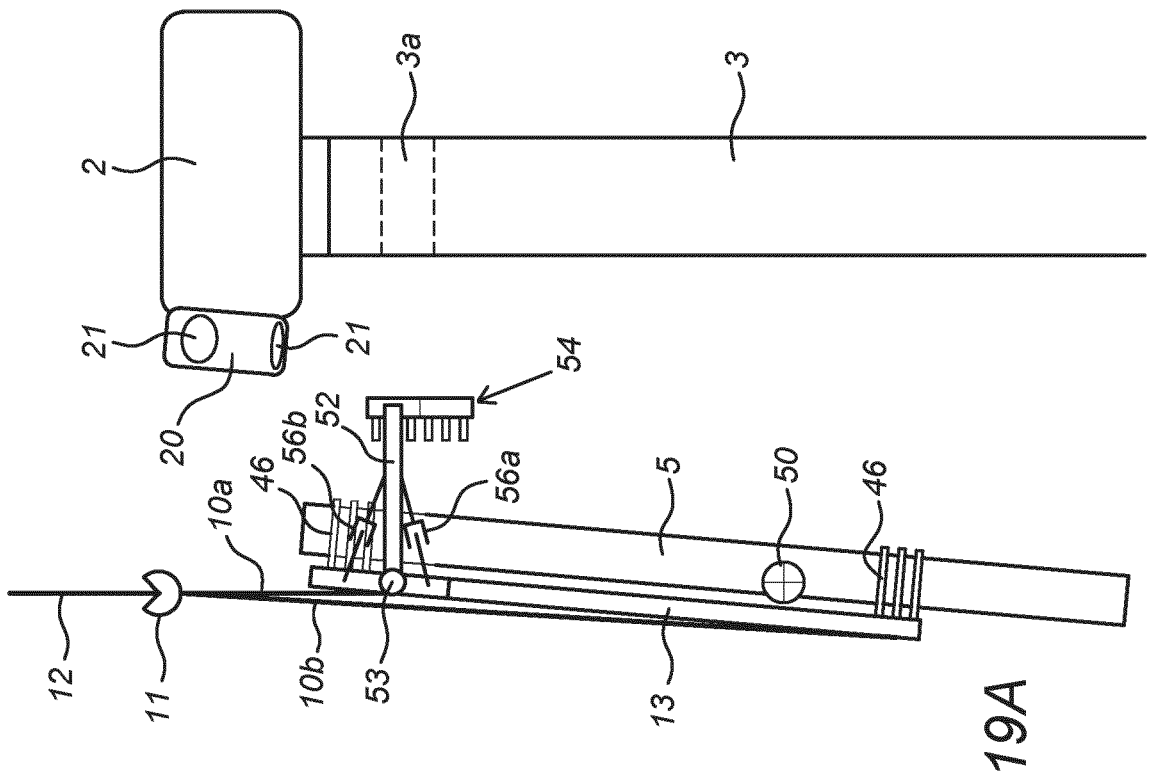

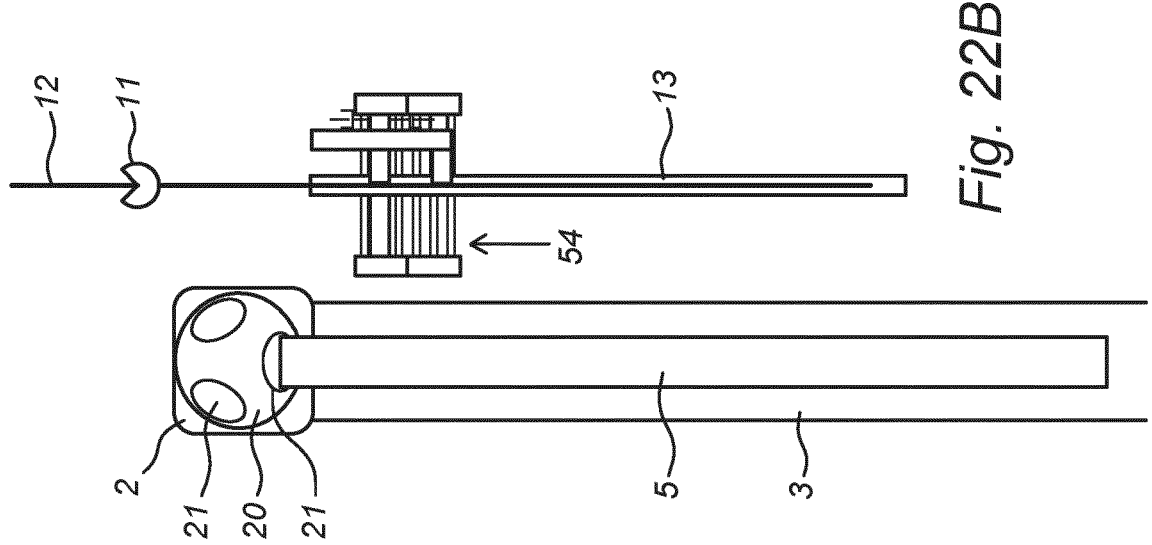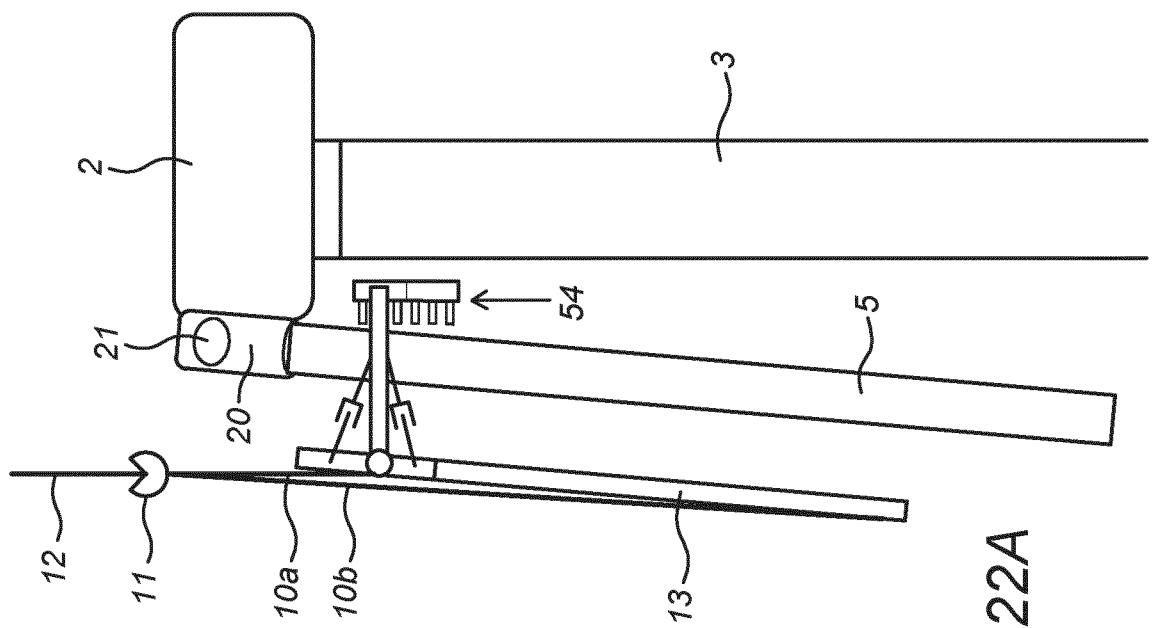

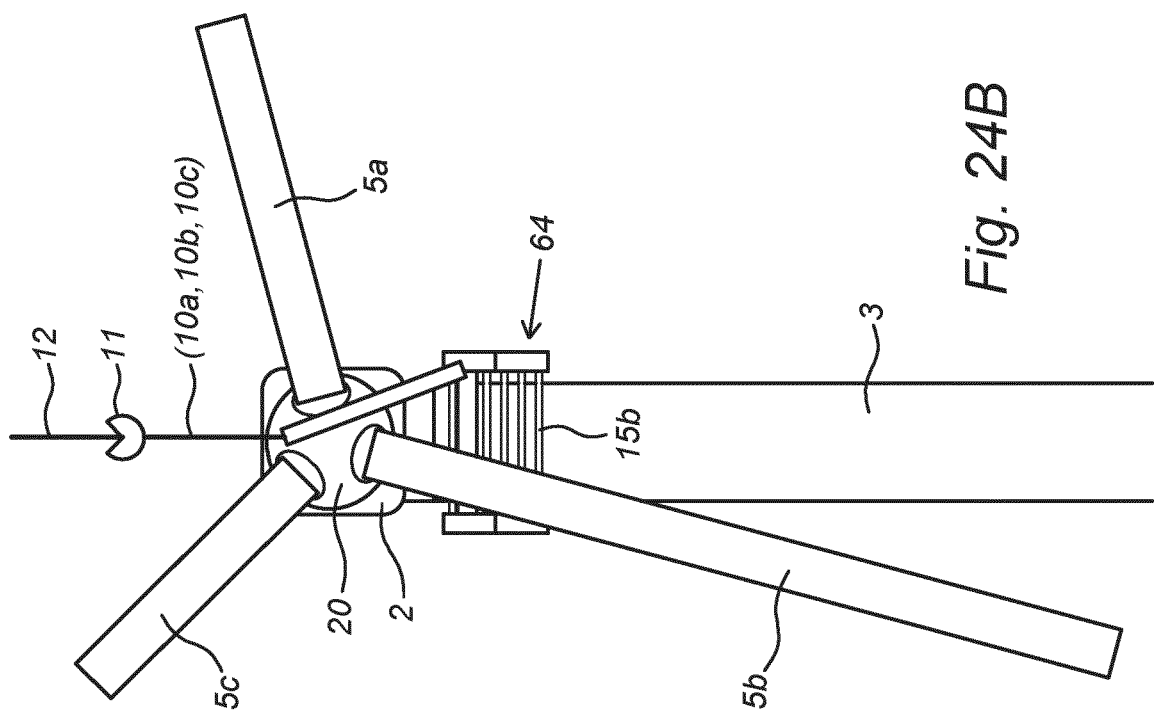
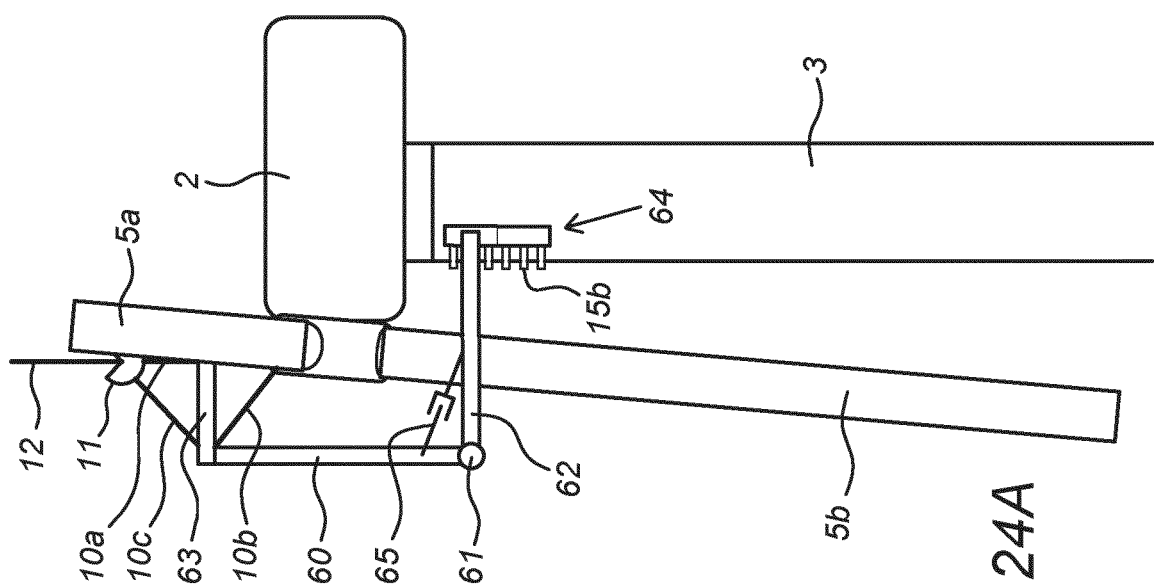

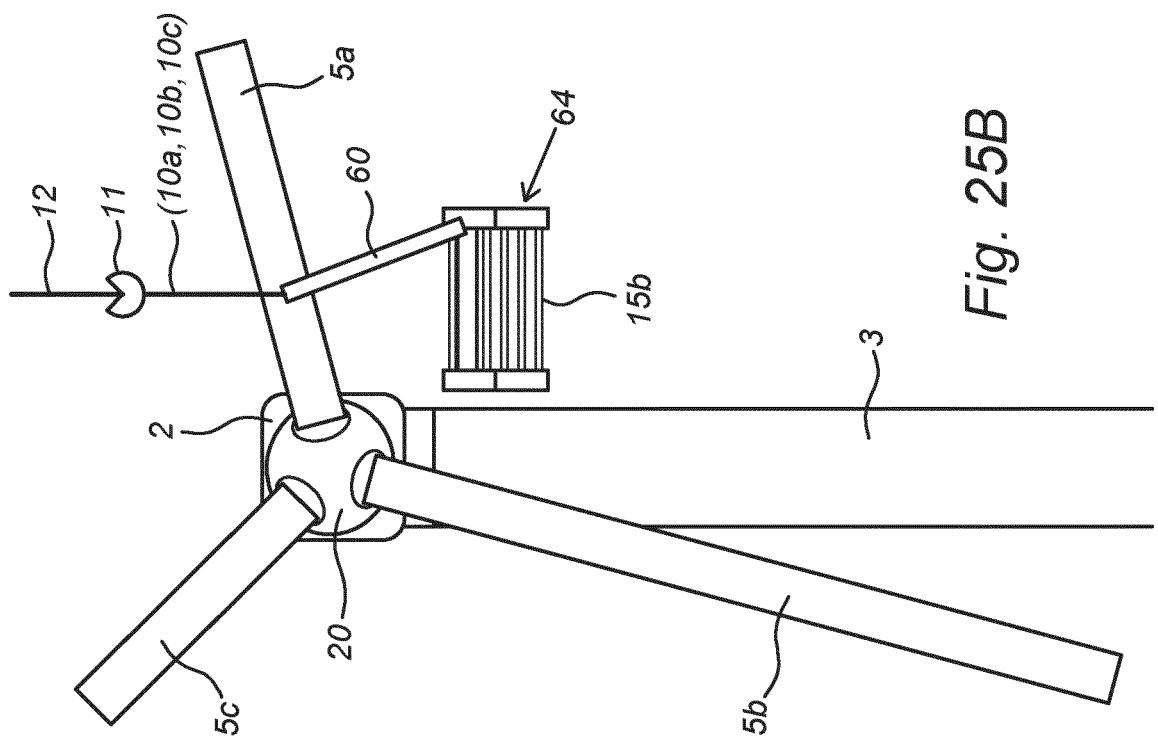
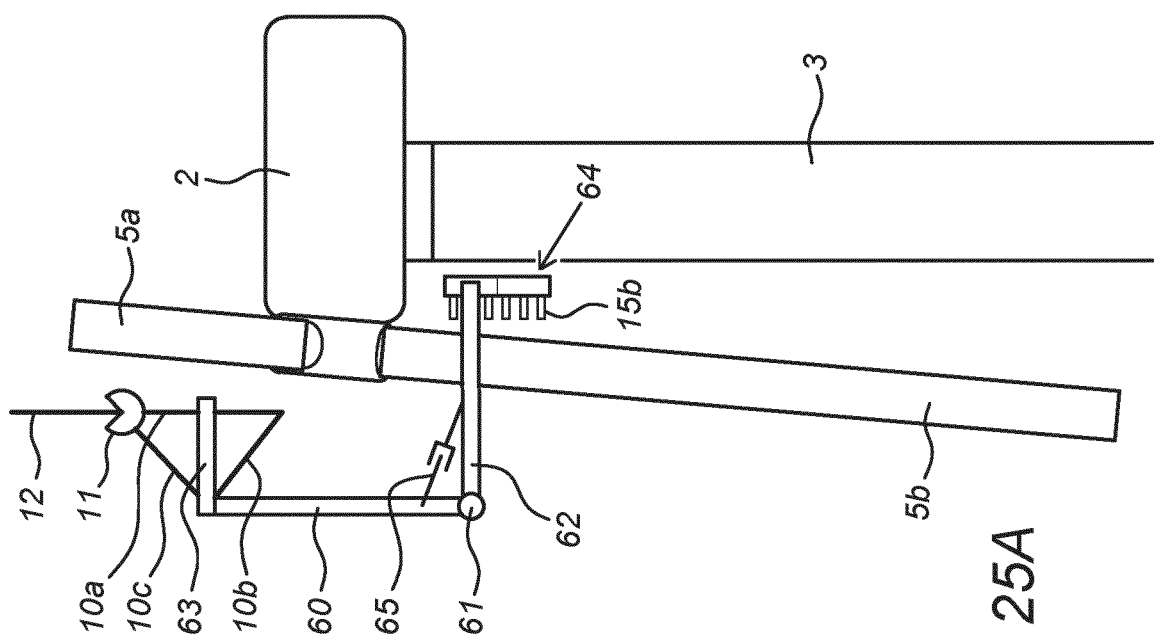
Fig. 25B
Fig. 25A

DEVICE AND METHOD FOR PLACING A COMPONENT OF A WIND TURBINE

CROSS REFERENCE TO RELATED APPLICATIONS

This application is the United States national phase of International Patent Application No. PCT/EP2021/070876 filed Jul. 26, 2021, and claims priority to Belgian Patent Application No. BE2020/5550 filed Jul. 27, 2020, the disclosures of which are hereby incorporated by reference in their entireties.

BACKGROUND OF THE INVENTION

Field of the Invention

The invention relates to a device for placing a component of a wind turbine on a wind turbine tower. The invention likewise relates to a method for placing a component of a wind turbine on a wind turbine tower, wherein use is made of the device. The invention relates particularly to a device and method for placing a nacelle, a wind turbine blade or a complete rotor of a wind turbine on a wind turbine tower.

Placing on a wind turbine tower is understood to mean placing a component directly on a wind turbine tower, such as when a nacelle is placed, or placing a component on another component already placed on the wind turbine tower, such as when a wind turbine blade is mounted on a nacelle already placed on a wind turbine tower. The placing can if desired also comprise of mounting the component in question.

Although the invention will be elucidated mainly within the context of placing a component of a wind turbine at sea, the device and method according to the invention can expressly be used both on land (onshore) and at sea (offshore).

DESCRIPTION OF RELATED ART

The number of high structures erected, maintained or repaired on land or offshore is growing. A typical example is a wind turbine (also referred to hereinbelow as WTG) comprising a gondola (or nacelle) which is placed on a wind turbine tower or mast and forms the housing for electromechanical equipment such as a power generator. The nacelle is provided with a hub on which a number of wind turbine blades are arranged, these together forming a rotor. The wind turbine blades convert the kinetic energy of the wind into a rotating movement of the shaft of the nacelle, which is converted into electrical energy by the power generator.

During the placing of components of such large structures the components are taken up according to the prior art by a lifting crane and placed and mounted on an already available support structure for the structure, or on an already placed component of the structure. In the case of a wind turbine the support structure can for instance comprise a wind turbine tower placed on a suitable foundation.

During the lifting of a load with an offshore lifting crane mounted on a vessel movements of the load will be caused by movements of the vessel itself, such as pitch, yaw, roll, surge, sway and heave. Movements of the load can also be caused by a wind load on the load. A tag line and/or a tugger system will typically be present in order to control and stabilize movements of the load during the lifting from the vessel, so that relative movements between the load and the vessel are controlled.

The lifting and placing of large, slender components, such as for instance a wind turbine blade, can also be hampered by wind load. A wind turbine blade in particular has to be attached by means of bolt connections to a hub, this requiring a precise positioning of the wind turbine blade relative to a hub already installed on a mast. During mounting of a wind turbine nacelle from a floating vessel on an offshore foundation—a turbine tower fixed to the seabed, or optionally a floating wind turbine tower—the relative movements between the nacelle taken up by a hoisting means and the foundation must also be controlled in order to bring the nacelle in line with the receiving flange.

An object of the present invention is to provide a device and method with which a structural component, in particular a component of a wind turbine, can be placed and, if desired, mounted on a support structure, particularly a wind turbine tower, onshore or offshore, wherein the relative movements between a component taken up with a hoisting means and the support structure can be controlled better than is the case in the prior art.

SUMMARY OF THE INVENTION

This object is achieved with a device as described herein. A device for placing a component of a wind turbine on a wind turbine tower comprises according to the invention a hoisting means with a hoisting cable for taking up the component, and a positioning tool which is connected to the hoisting cable and an intermediate construction of which is connected to the hoisting cable, and a guide frame of which is connected on one side to the intermediate construction and is provided on another side with engaging means for engaging a peripheral part of the wind turbine tower.

The invented device contributes to the (initial) setup and adjustment during placing of a wind turbine component such as a nacelle from for instance a (floating) installation vessel, and the control of the relative movements of the component and the receiving wind turbine tower. The invented positioning tool operates as a structural added component which is integrated with the hoisting cable, or with a hoisting guide frame, via the intermediate construction connected to the hoisting cable in order to stabilize the component while it is being taken up, wherein the fixed wind turbine tower is used as support and guide.

By making use of a guide frame which is connected via the intermediate construction to the hoisting cable and which supports on a support side on a peripheral part of the wind turbine tower by means of the engaging means the taken-up component is as it were temporarily connected flexibly to the wind turbine tower, whereby relative movements thereof relative to the wind turbine tower are reduced.

An embodiment relates to a device wherein the suspension of the intermediate construction from the hoisting cable is able to absorb a moment of force.

The component can be positioned relative to the wind turbine tower or partially erected wind turbine tower by suspending the component from the hoisting cable of a hoisting means such as for instance a lifting crane and rotating the hoisting means about a vertical axis by rotating a boom of the hoisting means up and downward in a lifting plane, and/or by moving a hoisting tackle or hoisting guide frame suspended from the hoisting cable up and downward with the hoisting cable. A positioning of the component which is substantially independent of wind and vessel movement is made possible by coupling the component at least temporarily to the wind turbine tower. This is understood to mean that influences of wind and vessel movements are substantially neutralized.

A further advantage of the invented device is that it allows work to take place in considerably more unfavourable conditions, whereas the known device can only be deployed up to determined wind speeds and swell. The assembly time of a wind turbine can hereby be significantly reduced. It thus for instance becomes possible to place a component at an operational swell of up to HS=2 m (significant wave height of 2 m) and more, for instance HS=2.5 m or 3 m. In addition, vessel dimensions and vessel shape and wave length can also play a part.

In an embodiment of the invention the guide frame is pivotally connected on one side to the intermediate construction, and the guide frame can be brought into different angular positions relative to the intermediate construction using angle adjusting means. In this way it becomes possible to realize a connection between the wind turbine tower and the taken-up component, wherein an optimal engagement with the peripheral part of the wind turbine tower is possible. A certain flexibility is also built into the connection in this way, which is important for bridging an initially lesser alignment between the component and the wind turbine tower.

The device can be seen as an extension of the hoisting cable or lifting tool connected thereto, and in this embodiment brings about a mechanical 'soft' connection between the wind turbine tower and the taken-up WTG component. The rigidity of the connection depends on a number of factors, such as the rigidity of the guide frame and (transverse) beams which may be used therein; on the characteristics of the applied pivoting connection; on the possible use of springs between guide frame and intermediate construction; on the characteristics of optionally applied (hydraulic, pneumatic and/or electric) cylinders between guide frame and intermediate construction; and on the properties of the engaging means which can also have a certain elasticity.

In an embodiment of the invention it is thus possible to provide the device with angle adjusting means configured to move the guide frame between angular positions relative to the intermediate construction with damping. This allows relative movements between the taken-up component and the wind turbine tower to be absorbed and damped.

It is also possible to provide a different embodiment wherein the angle adjusting means are configured to hold the guide frame in a fixed angular position relative to the intermediate construction. In this embodiment the connection between guide frame and intermediate construction is substantially rigid, and possible relative movements between the component temporarily connected to the wind turbine tower via the positioning tool and the wind turbine tower are absorbed by the hoisting cable.

The angle adjusting means can be configured in any manner known to the skilled person. It has practical advantages for the angle adjusting means to comprise in an embodiment at least one spacer arranged between the intermediate construction and the guide frame, which spacer is variable in length and thus varies the angular position between the intermediate construction and the guide frame. A suitable embodiment has at least one spacer in the form of a hydraulic cylinder. It is also possible to provide a spacer in the form of a different spring-back construction, for instance an electric or pneumatic cylinder. A spacer based on a tool other than a hydraulic cylinder is also possible.

As soon as the initial 'soft' connection between the device and the wind turbine tower has been formed, the engaging means can engage a peripheral part of the wind turbine tower in order to bring about the connection and to be able to transmit forces to the wind turbine tower. It is advantageous for the engaging means to engage a top part of the wind turbine tower here, wherein a top part generally comprises an upper half of the wind turbine tower, more preferably an upper 40% of the length, still more preferably an upper 30% of the length, still more preferably an upper 20% of the length, and most preferably an upper 10% of the length of the wind turbine tower. The length is here the length of the part of the wind turbine tower extending above the sea surface.

The height of the engagement on the wind turbine tower, and so the distance covered by the engaging means in a longitudinal direction of the wind turbine tower, can be chosen within practical limits. A determined distance can for instance be important if a moment of force must be absorbed. A typical moment of force which can be absorbed and transmitted by the tool lies for instance between 2000 kNm and 5000 kNm when the horizontal force exerted on the wind turbine tower amounts to respectively between 10 t (100 kN) and 20 t (200 kN), and the lifting point (or the hoisting beam) lies respectively 20 m to 25 m higher than the point of engagement on or at the wind turbine tower. A suitable distance covered by the engaging means in a longitudinal direction of the wind turbine tower amounts to for instance 20% of the height of the wind turbine tower, more preferably to 15% of the height, and most preferably to 10% of the height.

In a first embodiment of the engagement the engaging means are configured to engage a peripheral part extending through a peripheral angle≤180° of the periphery of the wind turbine tower. In this embodiment a relatively small offset of the vessel relative to the wind turbine tower can ensure that a substantially horizontally directed force is exerted on the wind turbine tower. Such a dynamic equilibrium of forces can allow the relative movements of the taken-up component relative to the wind turbine tower to be absorbed or compensated for to a certain extent.

In a second embodiment of the engagement engaging means are provided which are configured to engage a peripheral part extending through a peripheral angle>180° of the periphery of the wind turbine tower, and preferably extends over substantially the whole periphery. This provides for a temporary connection between the taken-up component and the wind turbine tower, which can transmit forces in substantially all horizontal directions.

From the moment that the mechanical connection is brought about, the invented device, and particularly the positioning tool thereof, can in embodiments optionally also help align in a rotation direction a component flange relative to a receiving flange to which the component must be coupled. It is also possible with the invented device, and particularly with the positioning tool thereof, to exert according to embodiments a vertical force on a component which has already connected to the wind turbine tower, without already being coupled thereto. Such a vertical force provides damping and can help prevent unacceptable shock loads in the component.

In an embodiment the engaging means themselves are selected from bumpers, rolls, wheels, caterpillar tracks, suction cups and support straps, and combinations thereof. The engaging means are here configured such that they are able to bear the forces acting on the wind turbine tower.

According to the invention, an intermediate construction of the positioning tool provides for the connection to the hoisting cable. The intermediate construction can here form the geometric bridge between the taken-up or suspended component and the guide frame whereby the temporary connection to the wind turbine tower is formed.

It is possible in an embodiment for the intermediate construction to comprise a hoisting frame for the component. The use of a hoisting frame or hoisting yoke is advantageous because it can be adapted to the component to be lifted. The use of a hoisting yoke is particularly advantageous when taking up and lifting wind turbine blades for wind turbines. Rotor blades are generally vulnerable since they must by nature be light and for this reason are preferably manufactured from fibre-reinforced plastic. A hoisting yoke can be adapted to avoid damage to the component to be taken up.

The geometry of the intermediate construction can be chosen such that the guide frame can be positioned in optimal manner relative to the peripheral part of the wind turbine tower to be engaged so as to be able to obtain an optimal force transmission to the tower.

It is possible to apply the device according to the invention without additional auxiliary means. It is however sometimes essential to apply auxiliary devices, particularly a tugger winch with tag line provided on the vessel—which also comprises the hoisting means. Using the tag line a lifted component can be engaged and kept further under control. The tag line is tightened or payed out by means of the available tugger winch.

The device according to the invention is particularly suitable for placing a component of a wind turbine on a wind turbine tower, wherein the component comprises a nacelle, a wind turbine blade and/or a rotor. The intermediate construction of the device in particular will be adaptable for each specific component.

According to another aspect of the invention, a method is for this purpose provided which comprises the steps of:
 providing a hoisting means;
 taking up the component to be placed by a hoisting cable of the hoisting means, wherein a positioning tool is connected via an intermediate construction thereof to the hoisting cable and a guide frame of the positioning tool is connected on one side to the intermediate construction and is provided on another side with engaging means;
 bringing the taken-up component into the vicinity of the wind turbine tower using the hoisting means;
 engaging a peripheral part of the wind turbine tower with the engaging means of the positioning tool;
 placing the component on the wind turbine tower;
 removing the engaging means from the peripheral part.

The component taken up with the hoisting means is preferably brought into the vicinity of a top part of the wind turbine tower.

An embodiment relates to a method wherein the suspension of the intermediate construction from the hoisting cable absorbs a moment of force.

In an embodiment of the method the guide frame can further be pivotally connected on one side to the intermediate construction, and the guide frame can be brought into different angular positions relative to the intermediate construction using angle adjusting means.

In order to be able to bring about the coupling between the taken-up component and the wind turbine tower, wherein the component must eventually be aligned with for instance a connecting flange of the wind turbine tower, an embodiment has the feature that the angle adjusting means move the guide frame between angular positions relative to the intermediate construction with damping.

In another embodiment it is also possible for the angle adjusting means to hold the guide frame in a fixed angular position relative to the intermediate construction. This is particularly important just before the coupling is brought about.

The angle adjusting means can comprise at least one spacer which is arranged between the intermediate construction and the guide frame and which is varied in length and thus varies the angular position between the intermediate construction and the guide frame. In an embodiment a suitable spacer comprises a hydraulic, pneumatic or electric cylinder.

With the engaging means a peripheral part extending through a peripheral angle≤180° of the periphery of the wind turbine tower can be engaged, although in other embodiments of the method the engaging means engage a peripheral part extending through a peripheral angle>180° of the periphery of the wind turbine tower, and preferably extending over substantially the whole periphery.

In some cases the component can be taken up with interposing of a hoisting guide frame. In such cases the hoisting guide frame forms part of the intermediate construction which connects the hoisting cable to the positioning tool.

In an embodiment in which a wind turbine blade is mounted, the wind turbine blade can be mounted on a hub of the wind turbine in a substantially horizontal position. This position is also referred to as a 3 o'clock position.

Another embodiment relates to a method wherein the component comprises a wind turbine blade, and the wind turbine blade is mounted on a hub of the wind turbine at an angle of substantially 0° to the vertical direction. This position is also referred to as a 6 o'clock position.

The invented device enables assembly of offshore wind turbines up to wind speeds of 12 m/s and more, where with the known device the mast and nacelle can be assembled up to wind speeds of 10 m/s, a complete rotor (a hub on which three blades are mounted) up to 9 m/s, a nacelle with hub and two pre-mounted blades (the so-called bunny ear method) up to about 9 m/s and individual wind turbine blades up to 8 m/s.

In the case the device is applied for placing at sea of a wind turbine constructed from components, work preferably takes place from a (floating) vessel, or from a jack-up platform, which provides more stability. The wind turbine tower is then already present at sea.

BRIEF DESCRIPTION OF THE DRAWINGS

The invention will now be elucidated in more detail with reference to the accompanying figures, without otherwise being limited thereto. In the figures:

FIG. 3A-11A are schematic side views of a number of steps of a method according to an embodiment of the invention;

FIG. 3B-11B are schematic rear views of the steps shown in FIGS. 3A-11A according to the embodiment of the invention;

FIG. 12A-16A are schematic side views of a number of steps of a method according to another embodiment of the invention;

FIG. 12B-16B are schematic top views of the steps shown in FIGS. 12A-16A according to the embodiment of the invention;

FIG. 17A-22A are schematic side views of a number of steps of a method according to yet another embodiment of the invention;

FIG. 17B-22B are schematic rear views of the steps shown in FIGS. 17A-22A according to the embodiment of the invention;

FIG. 23A-25A are schematic side views of a number of steps of a method according to yet another embodiment of the invention;

FIG. 23B-25B are schematic front views of the steps shown in FIGS. 23A-25A according to the embodiment of the invention; and, finally

DESCRIPTION OF THE INVENTION

Figure 2:
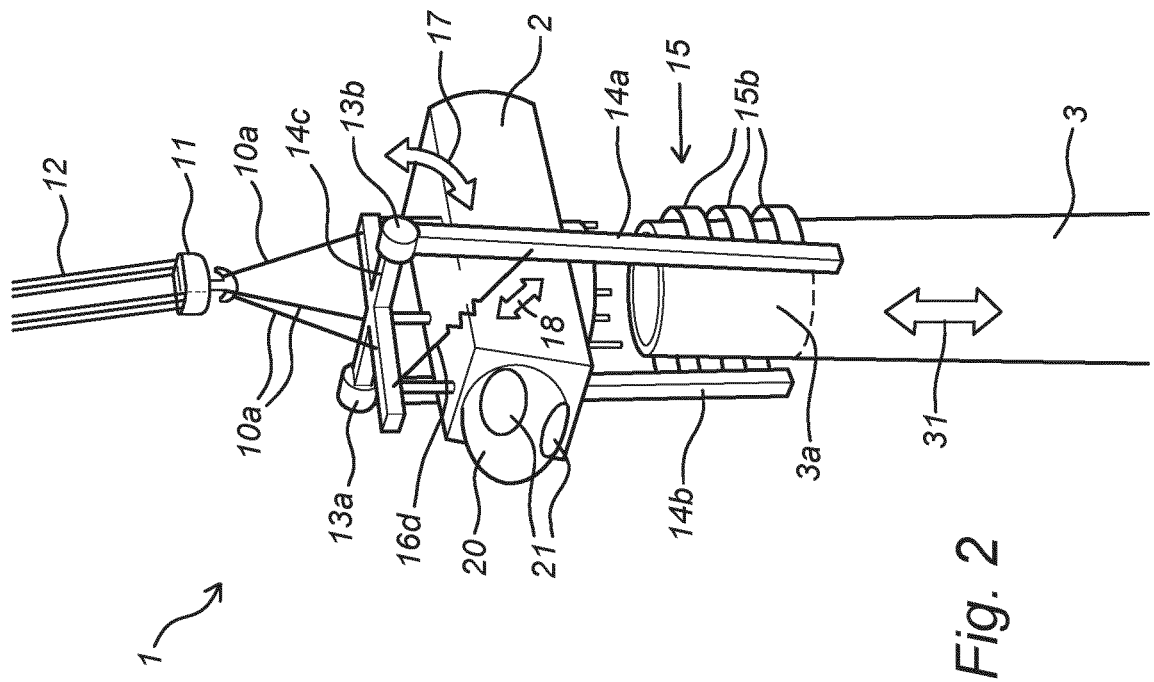
FIG. 2 is a schematic perspective view of another embodiment of the device according to the invention arranged round a turbine tower.

The same or similar components are designated in the figures with the same reference numerals.

Figure 1:
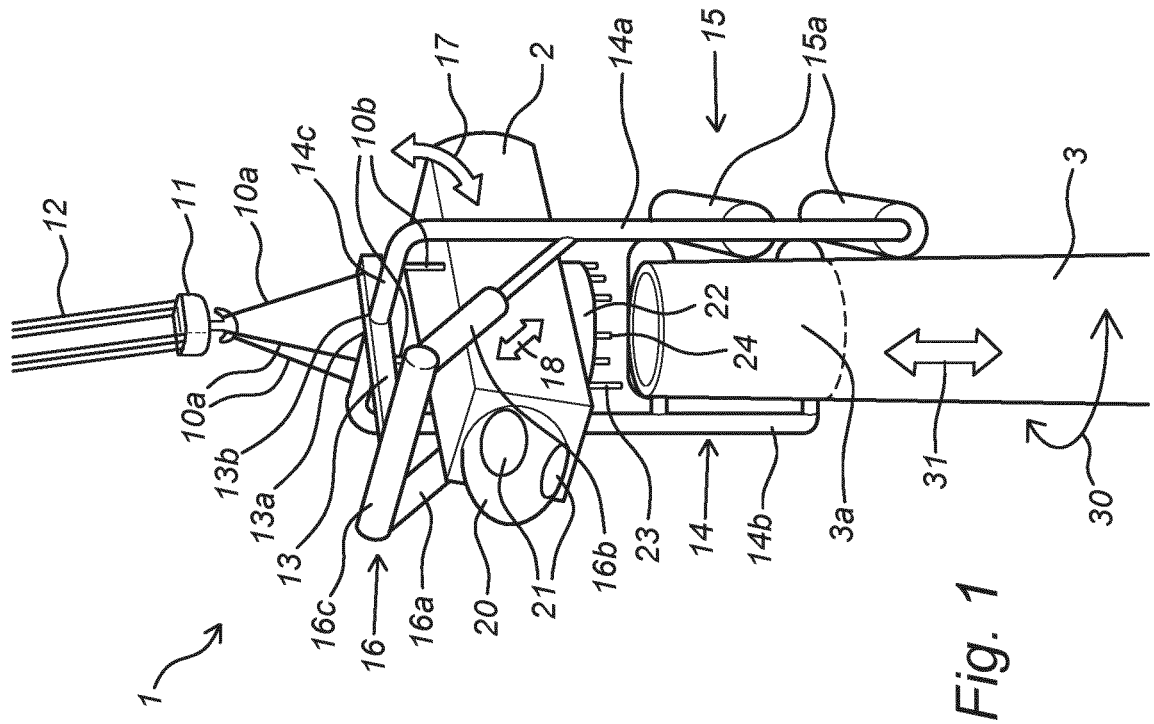
FIG. 1 is a schematic perspective view of an embodiment of the device according to the invention arranged round a turbine tower.

Referring to FIG. 1, a device 1 according to an embodiment of the invention is shown, wherein the device 1 is configured to place a nacelle of a turbine on a turbine tower 3. The nacelle 2 is provided with a hub 20 with openings 21 in which wind turbine blades can be arranged. Provided on an underside of nacelle 2 is a connecting flange 22. Arranged on an underside of the connecting flange 22 are positioning pins 23 and bolt holes 24. Using connecting flange 22 the nacelle 2 can be connected to an upper side of wind turbine tower 3.

Device 1 comprises a number of hoisting cables (10a, 10b) whereby nacelle 2 can be taken up. In the shown embodiment the hoisting cables 10a are connected to a hoisting block 11 which in turn is suspended from hoisting cables 12 of the hoisting means (not shown), for instance a lifting crane. A positioning tool (14, 15) is connected to hoisting cables 10a. The positioning tool (13, 14, 15) comprises an intermediate construction, the form of which depends on the component to be placed and which is embodied according to FIG. 1 as a hoisting beam 13. Hoisting cables 10b connect hoisting beam 13 to the nacelle 2 to be placed. The positioning tool (13, 14, 15) is further provided with a guide frame 14 which is connected on one side to the hoisting beam 13 and which is provided on another side with engaging means 15 for engaging a peripheral part 3a of the wind turbine tower 3.

In the embodiment shown in FIG. 1 the engaging means 15 comprises a number of rolls 15a which are placed in a peripheral direction 30 of wind turbine tower 3 and which are arranged on guide frame 14. Guide frame 14 itself comprises two side arms (14a, 14b) which run in vertical direction 31 and which are connected to a horizontally running transverse beam 14c. Guide frame 14 is pivotally connected on one side to hoisting beam 13 by means of pivoting connections (13a, 13b). Guide frame 14 can then be brought into different angular positions relative to hoisting beam 13 using angle adjusting means 16, as shown schematically with arrow 17.

Angle adjusting means 16 are configured to move guide frame 14 between angular positions relative to hoisting beam 13 with damping. For this purpose the angle adjusting means 16 comprises two, for instance hydraulic, cylinders (16a, 16b) which are arranged on either side of a transverse beam 16c and which engage on the side arms (14a, 14b) of guide frame 14 and are able to exert thereon a force running in a longitudinal direction 18 of the hydraulic cylinders (16a, 16b). It is also possible to control the hydraulic cylinders (16a, 16b) such that guide frame 14 can be held in a fixed angular position relative to hoisting beam 13. The hydraulic cylinders (16a, 16b) function as spacers arranged between hoisting beam 13 and guide frame 14, which are variable in length and can thus vary the angular position between hoisting beam 13 and guide frame 14.

FIG. 2 shows another embodiment in which engaging means 15 comprise a number of support straps 15b which are placed in a peripheral direction 30 of wind turbine tower 3 and are arranged on guide frame 14. Guide frame 14 itself comprises two side arms (14a, 14b) which run in vertical direction 31 and which are connected to a horizontally running transverse beam 14c. Guide frame 14 is pivotally connected on one side to hoisting beam 13 by means of pivoting connections (13a, 13b) which are in this embodiment situated at outer ends of transverse beam 14c. Guide frame 14 can then be placed with angle adjusting means 16 in different angular positions relative to hoisting beam 13, as shown schematically with the arrow 17. Angle adjusting means 16 are shown schematically by a spring 16d arranged between hoisting beam 13 and guide frame 14.

In both the embodiment shown in FIG. 1 and that of FIG. 2 the engaging means 15 are configured to engage a peripheral part 3a which extends over a peripheral angle of about 180° of the periphery of wind turbine tower 3. It is also possible in embodiments that are not shown to configure the engaging means 15 such that they engage a peripheral part extending through a peripheral angle>180° of the periphery of wind turbine tower 3, and preferably extending over substantially the whole periphery.

Referring to FIGS. 3A-11A and FIGS. 3B-11B, different steps are shown of a method for placing the nacelle 2 of a turbine on a wind turbine tower 3. In the shown embodiment the side arms (14a, 14b) of guide frame 14 are connected pivotally (13a, 13b) to an outer end of hoisting beam 13.

Figure 5A:
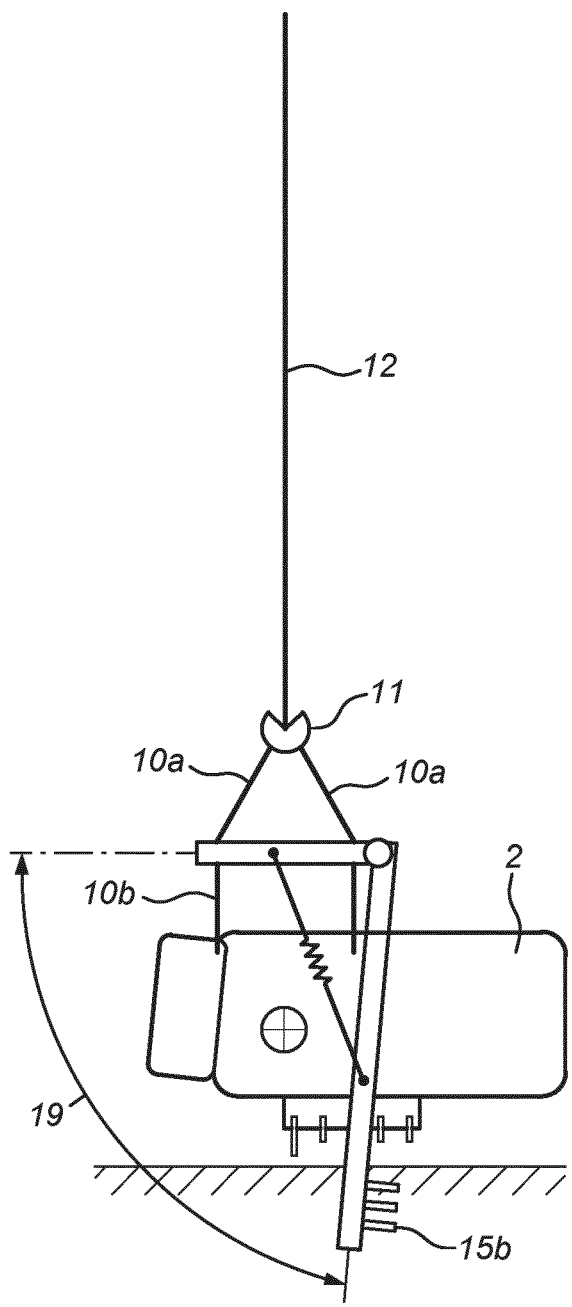
Figure 5B:
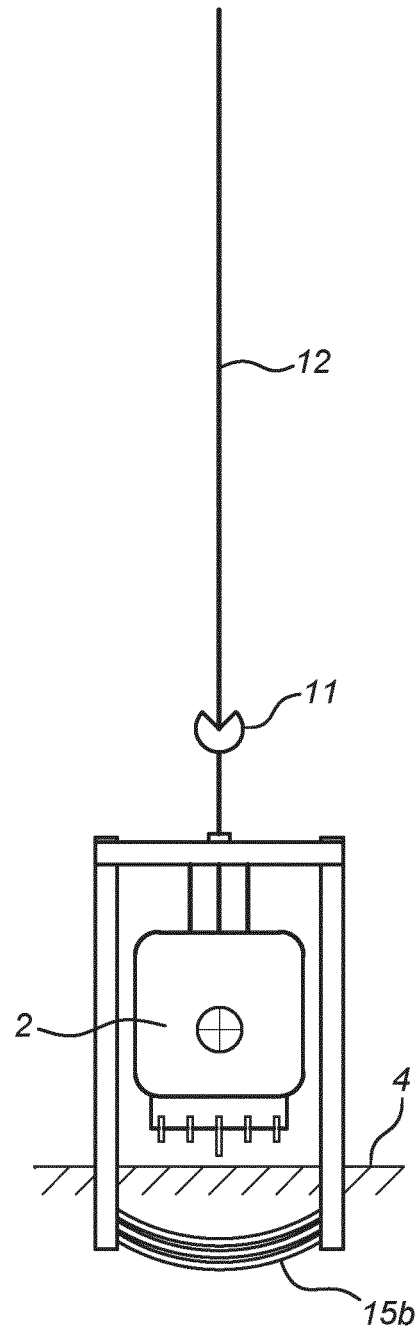

FIG. 3A shows a hoisting beam 13 which is suspended from hoisting cables 10a and to which a guide frame 14 (with side arms 14a and 14b) is pivotally connected. Guide frame 14 is held in a first angular position by the angle adjusting means 16 (such as the hydraulic cylinders (16a, 16b) or a spring connection 16d), wherein guide frame 14 forms an angle 19 of about 45° with a longitudinal direction of support beam 13. FIG. 3B shows a view of the setup of FIG. 3A from the right, so a rear view of nacelle 2. Nacelle 2 is situated on a ground surface 4 in a suitable support (not shown). Device 1 is lowered with the lifting crane (not shown) toward nacelle 2, into the position shown in FIGS. 4A and 4B, wherein the engaging means 15 (15b) are situated on an underside of nacelle 2. Nacelle 2 is then connected to hoisting cables 10b, and guide frame 14 is placed in a second angular position by angle adjusting means 16d, wherein guide frame 14 forms an angle 19 of about 90° with the longitudinal direction of support beam 13, and nacelle 2 is taken up by the hoisting cables 10b (FIGS. 5A and 5B).

Figure 6A:
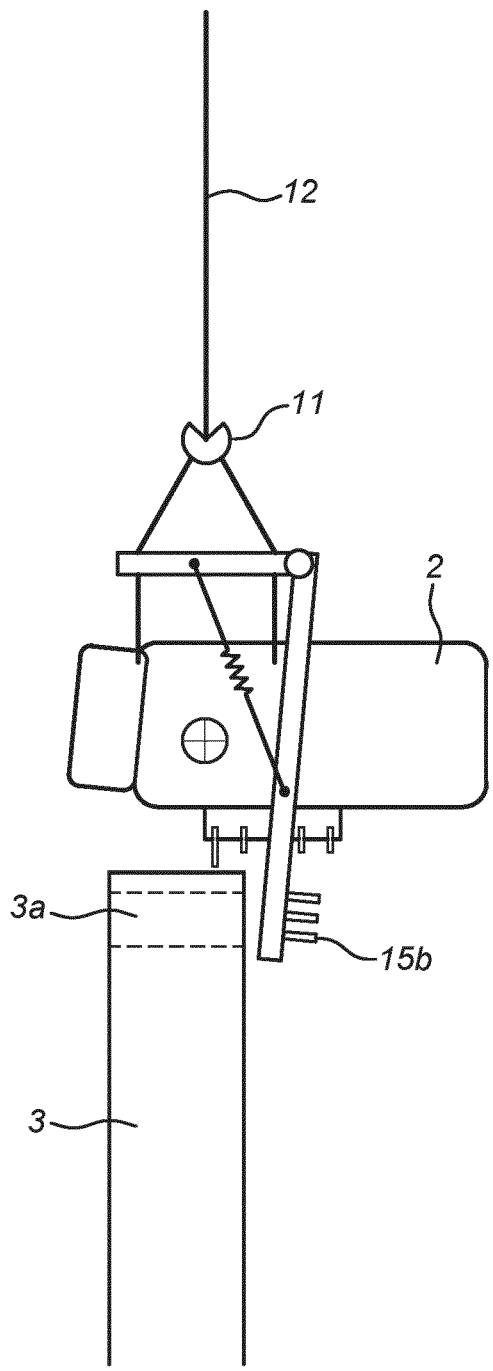
Figure 6B:
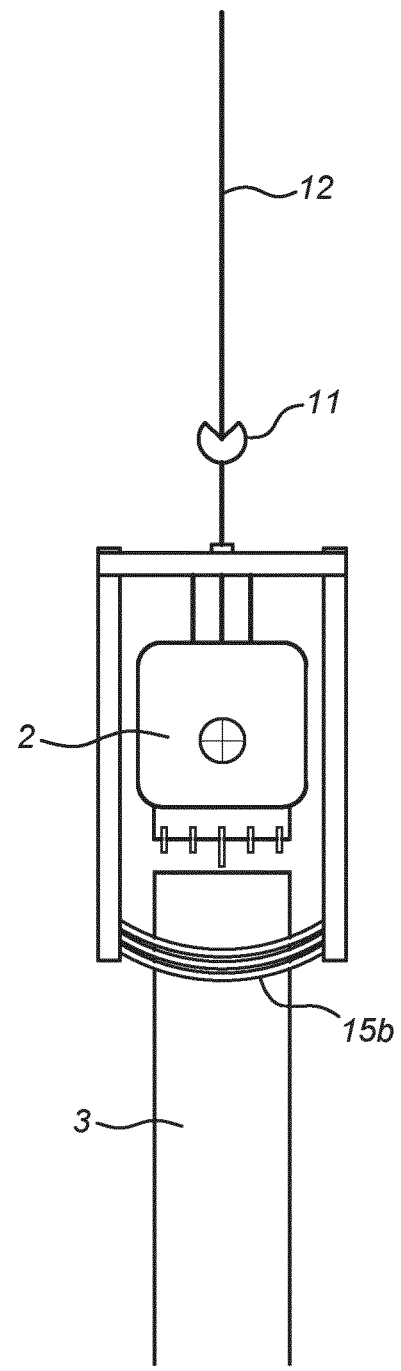
Figure 7A:
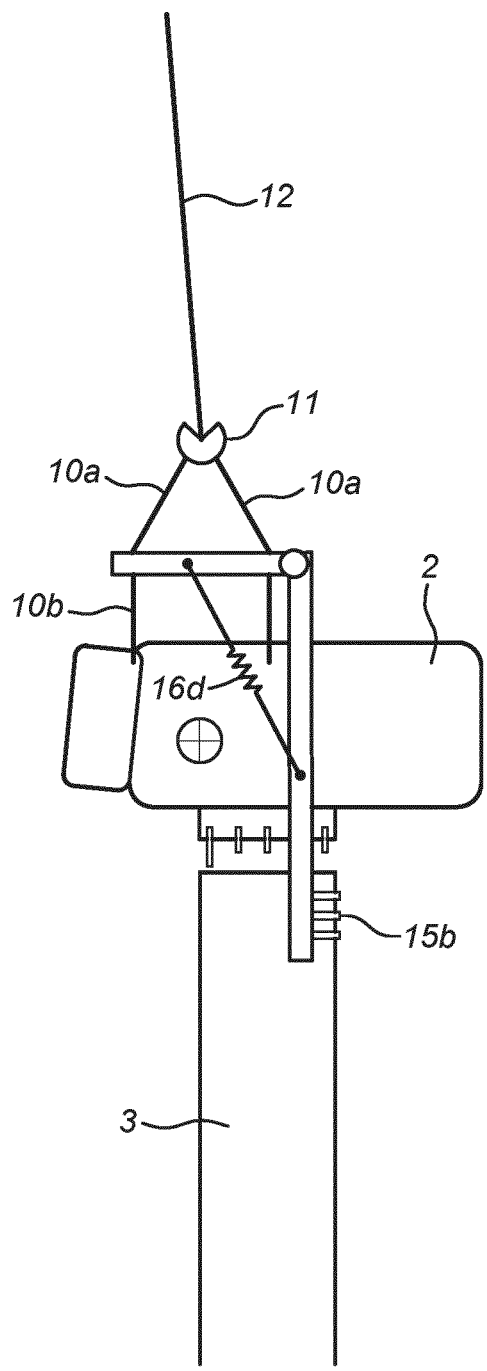
Figure 7B:
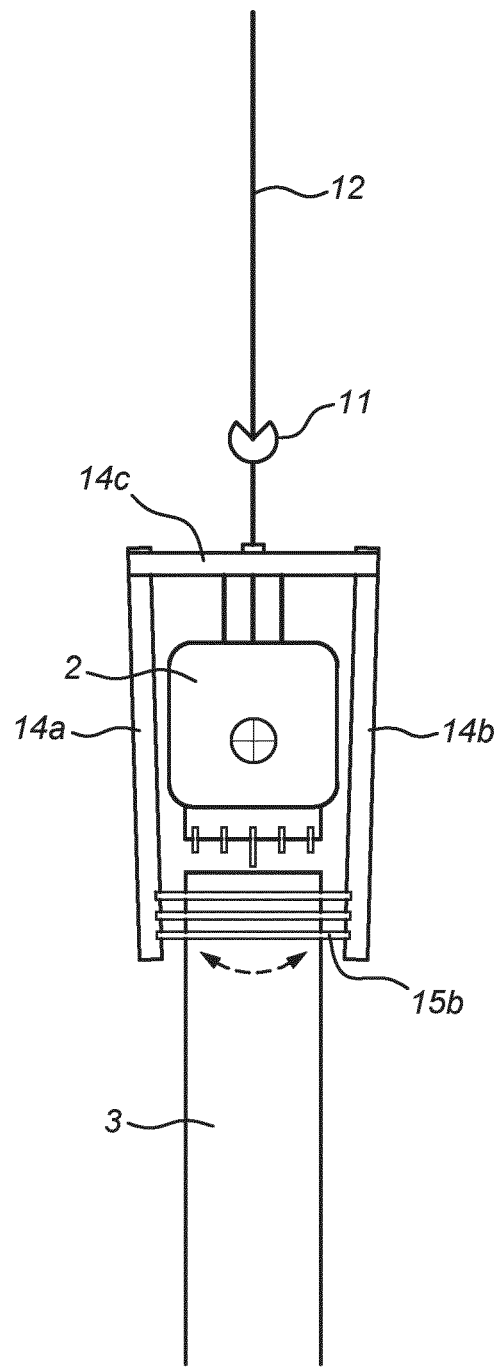

As shown in FIGS. 6A and 6B, nacelle 2 is brought into the vicinity of a top part of a turbine tower 3, wherein engaging means 15 in the form of the support straps 15b are situated at the position of a peripheral part 3a of the wind turbine tower 3 to be engaged. Peripheral part 3a is then engaged by the support straps 15b, wherein, if desired, guide frame 14 can co-displace with relative movements of the (moving) nacelle 2 and the (stable) wind turbine tower 3 with some damping. The angle adjusting means 16 (spring 16d or hydraulic cylinders 16a, 16b) then cause guide frame 14 and engaging means 15 to move relatively tightly against wind turbine tower 3 until the relative movements between nacelle 2 and wind turbine tower 3 have become so small that contact can be made between flange 22 of nacelle 2 and a corresponding flange of wind turbine tower 3, which can then be connected.

Figure 8A:
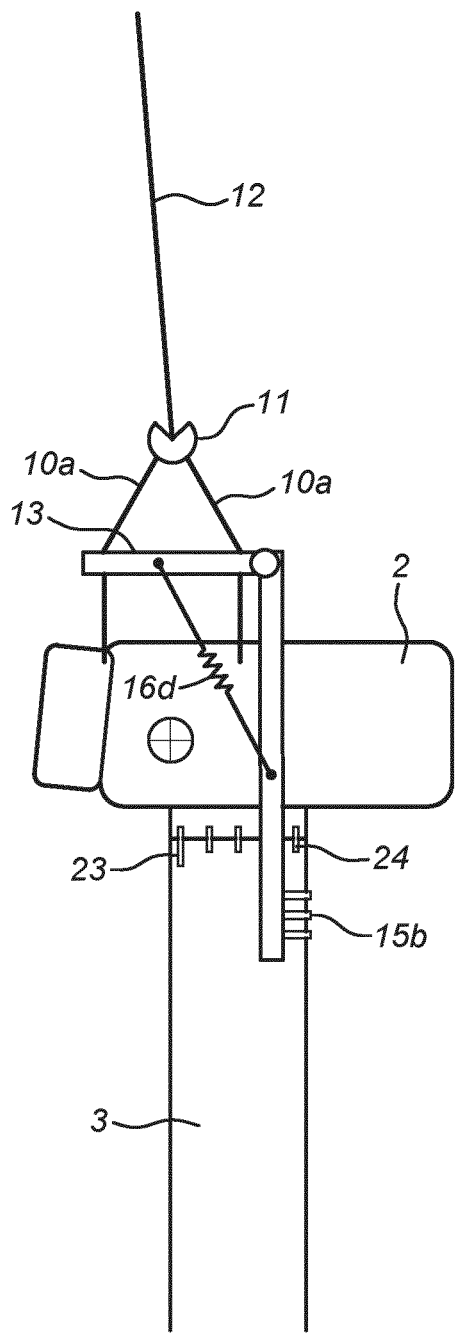
Figure 8B:
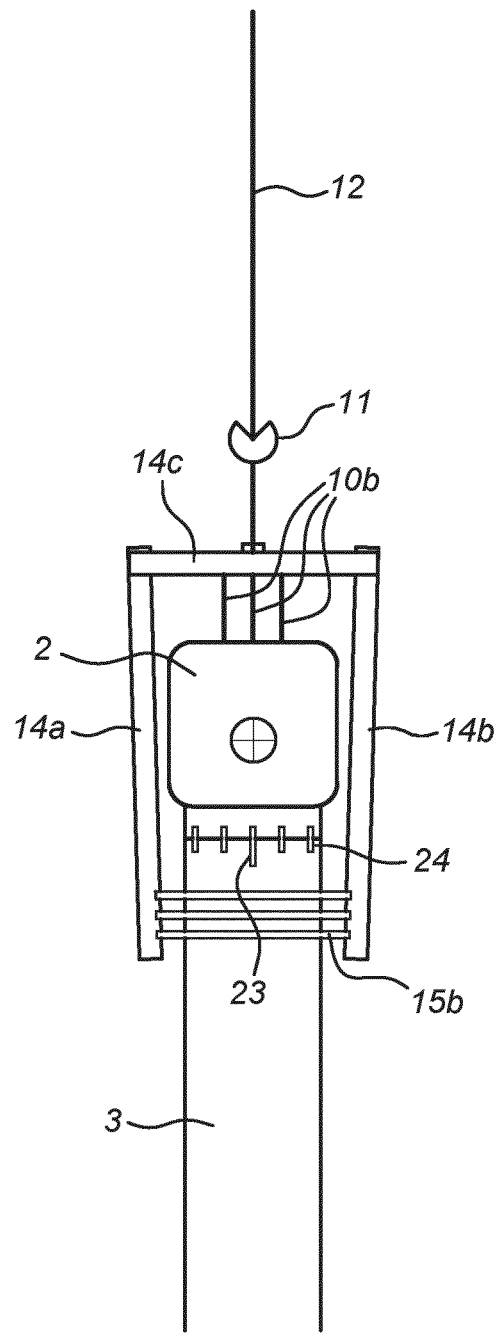
Figure 9A:
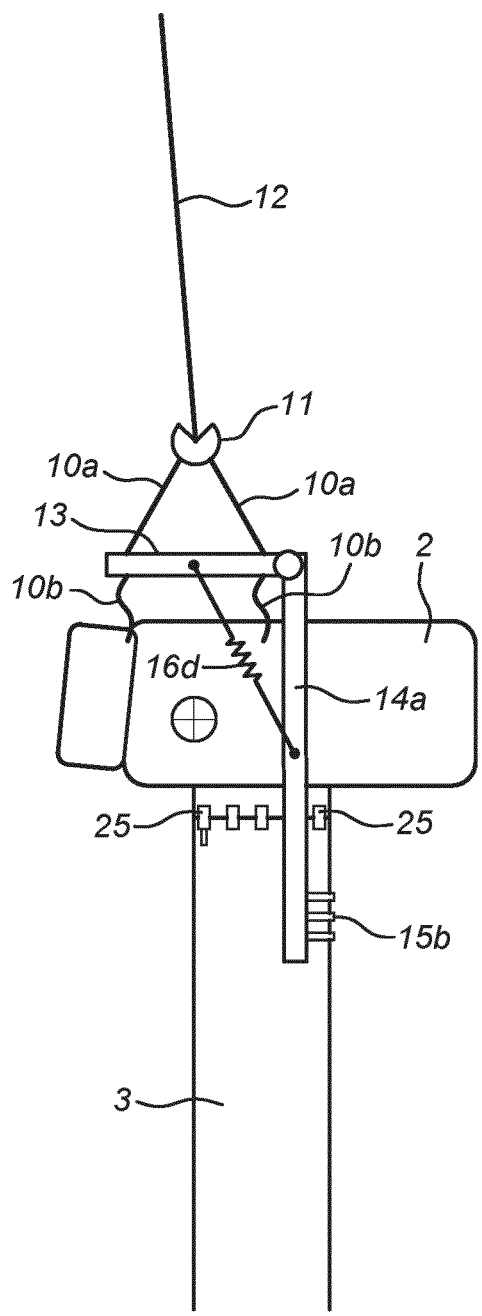
Figure 9B:
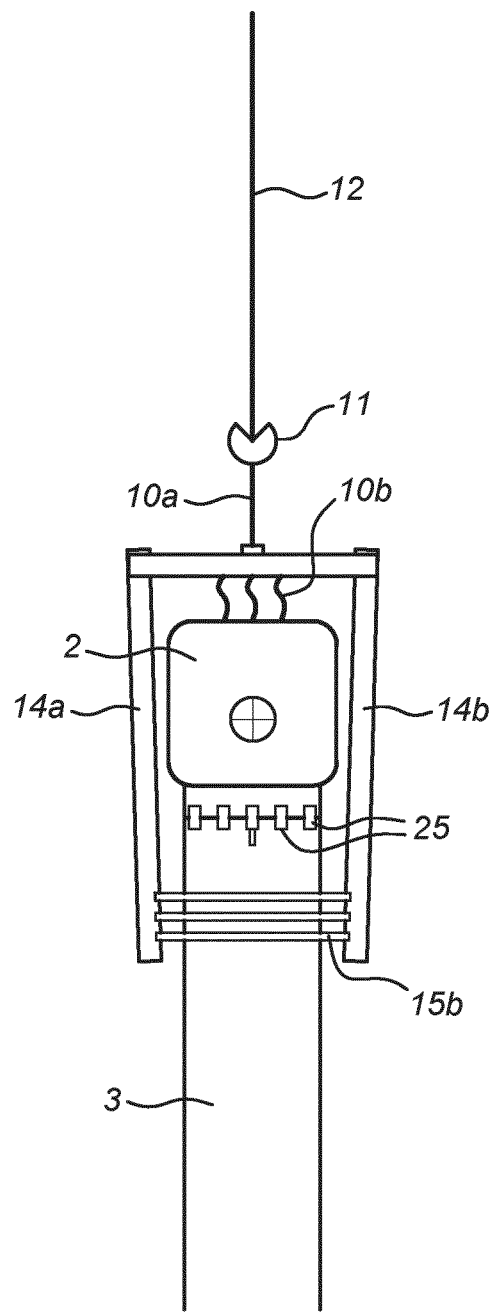

Such a connection is shown in FIGS. 8A and 8B and is obtained by lowering nacelle 2 with the crane until the corresponding flanges make contact with each other. Positioning pins 23 serve here to align flange 22 with corresponding openings in the wind turbine tower flange in the peripheral direction 30. According to FIGS. 9A and 9B, the connection is made by means of bolt connections 25 and hoisting beam 13 is then lowered slightly, wherein hoisting cables 10b become slack and can be detached from nacelle 2.

Figure 10A:
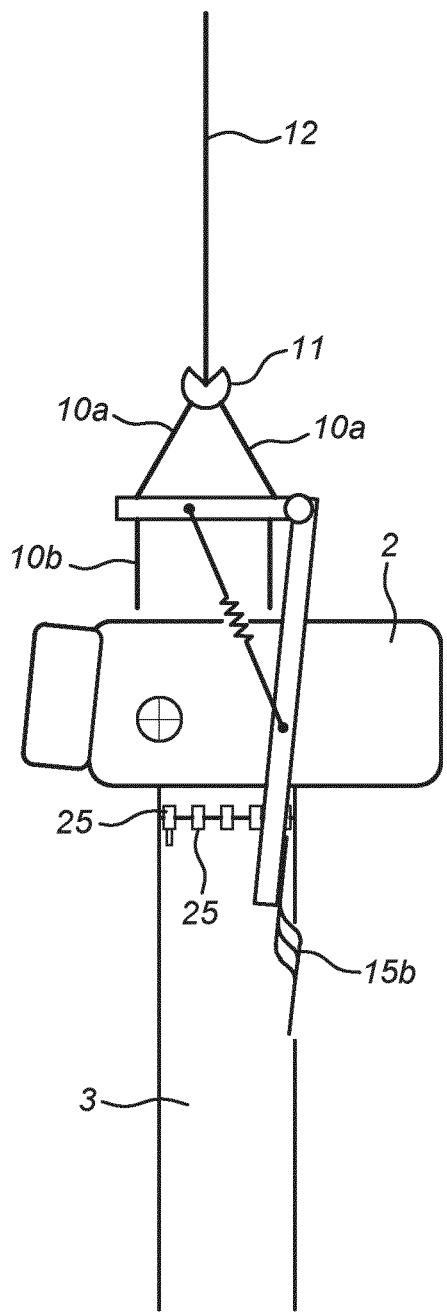
Figure 10B:
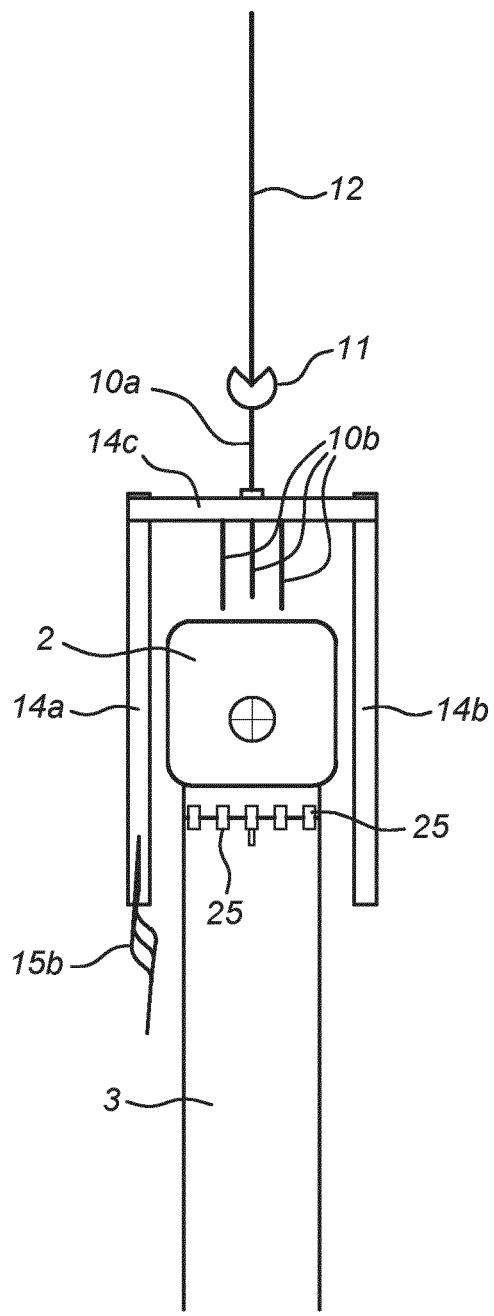
Figure 11A:
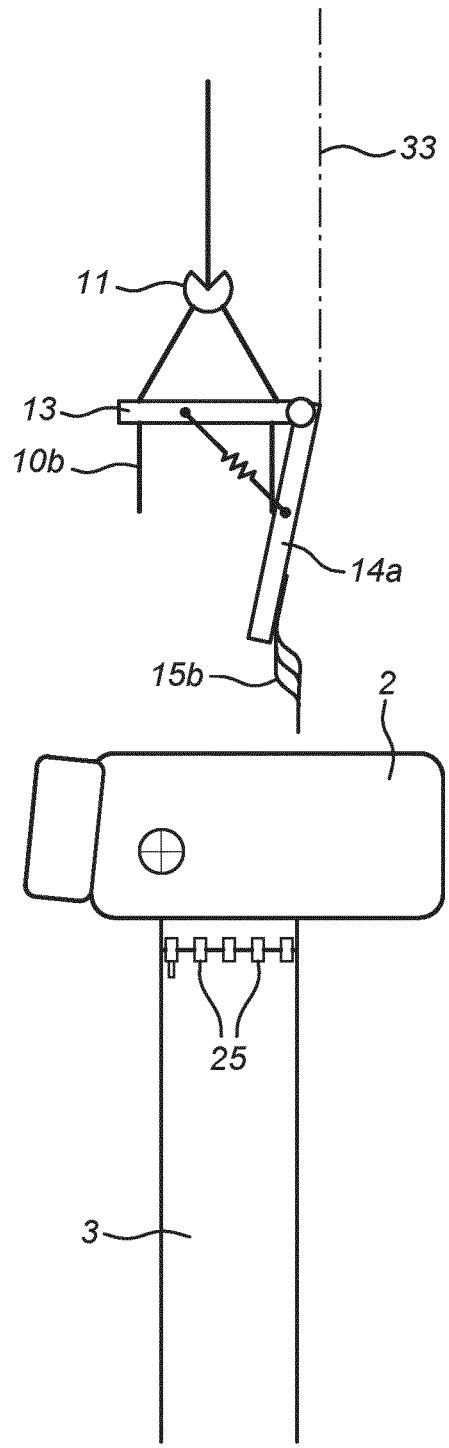
Figure 11B:
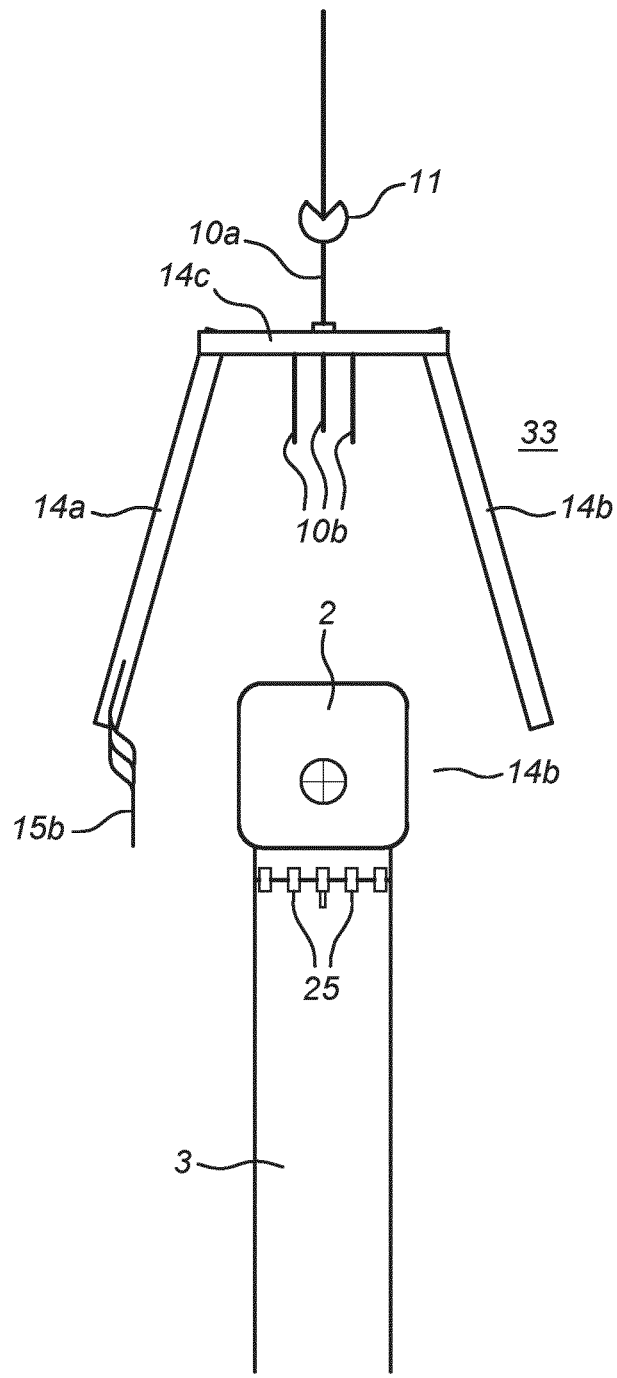

Referring to FIGS. 10A and 10B, in a subsequent step of the method the support straps 15b are detached from guide frame 14 and guide frame 14 is moved upward along nacelle 2 by the crane. According to FIG. 11B, this step can be facilitated in an embodiment by connecting the side arms (14a, 14b) to transverse beam 14c for pivoting in a transverse plane 33 and bringing it into an outward pivoted position. This is however certainly not essential.

Referring to FIGS. 12A-16A and FIGS. 12B-16B, different steps are shown of a method for placing a wind turbine blade 5 on the nacelle 2 of a wind turbine on a wind turbine tower 3 in a so-called 3 o'clock position.

FIG. 12A shows a positioning tool which is suspended from hoisting cables 10a and the geometry of which is adapted to the stated objective. The positioning tool comprises an intermediate construction (13, 40, 41, 42) which is suspended from hoisting cables 10a and which comprises a hoisting beam 13 to which a horizontally running support beam 42 is rigidly connected with interposing of two support beams (40, 41) running vertically downward. FIG. 12B shows a top view of the setup of FIG. 12A, which shows that the horizontal support beam 42 runs at a fixed angle 45 to support beam 13. The positioning tool further comprises a guide frame 44 (with side arms 44a and 44b connected to a transverse beam 44c) which is connected on one side to the intermediate construction (13, 40, 41, 42) and is provided on another side with engaging means 15 in the form of a number of support straps 15b.

Device 1 is lowered with the crane (not shown) toward wind turbine blade 5 and connected thereto using slings 46. The centre of gravity 50 of wind turbine blade 5 here lies approximately straight under the hoisting block 11, whereby wind turbine blade 5 is oriented in a substantially horizontal position. The engaging means 15 (15b) lie under the wind turbine blade 5.

Figure 12C:
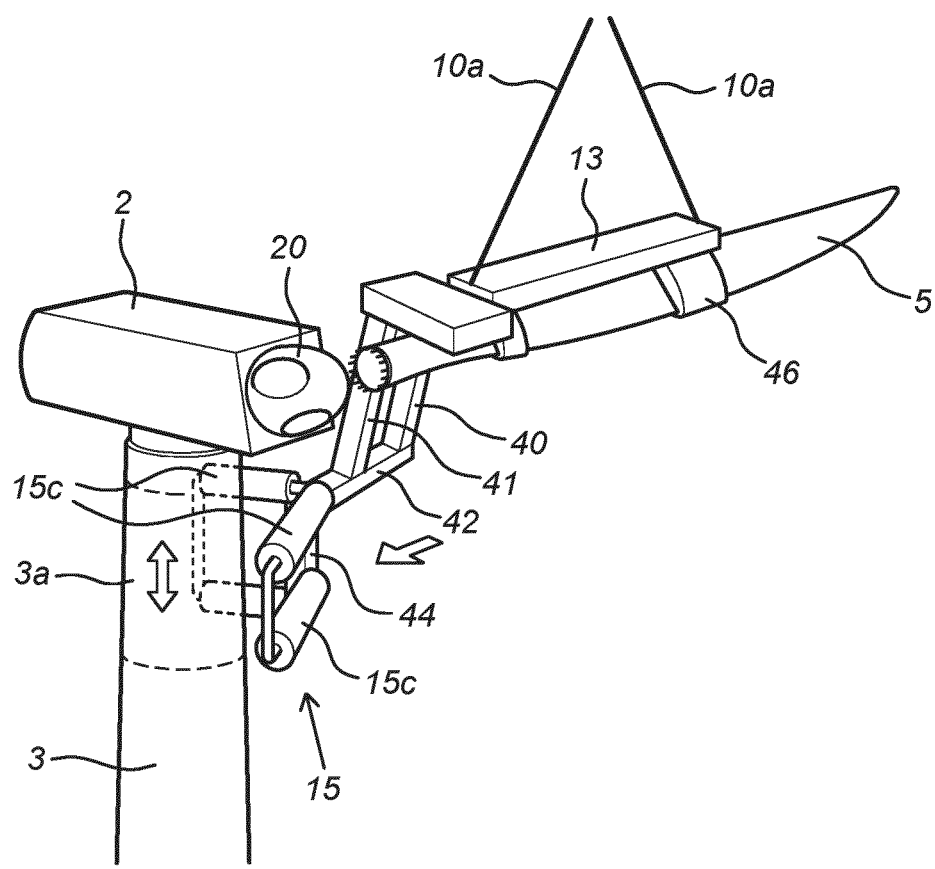
FIG. 12C is a schematic perspective view of a step of the embodiment of the invention shown in FIGS. 12A-16A.
Figure 14B:
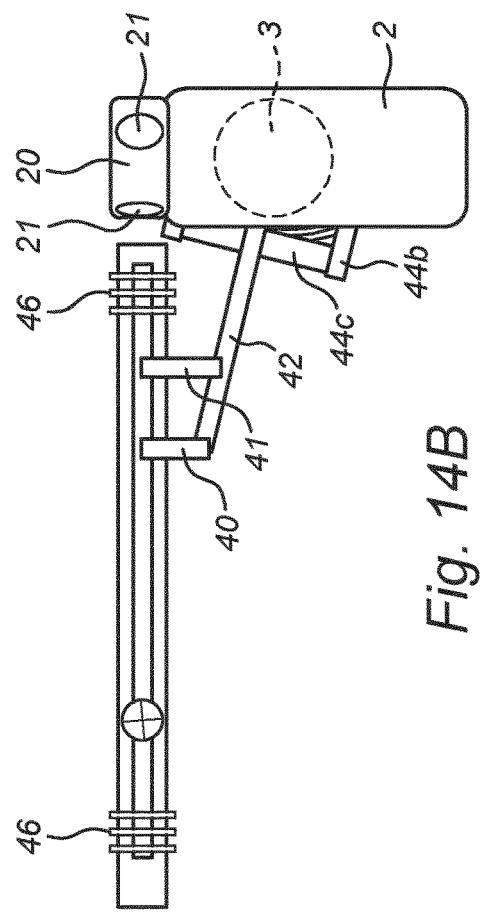
Figure 14A:
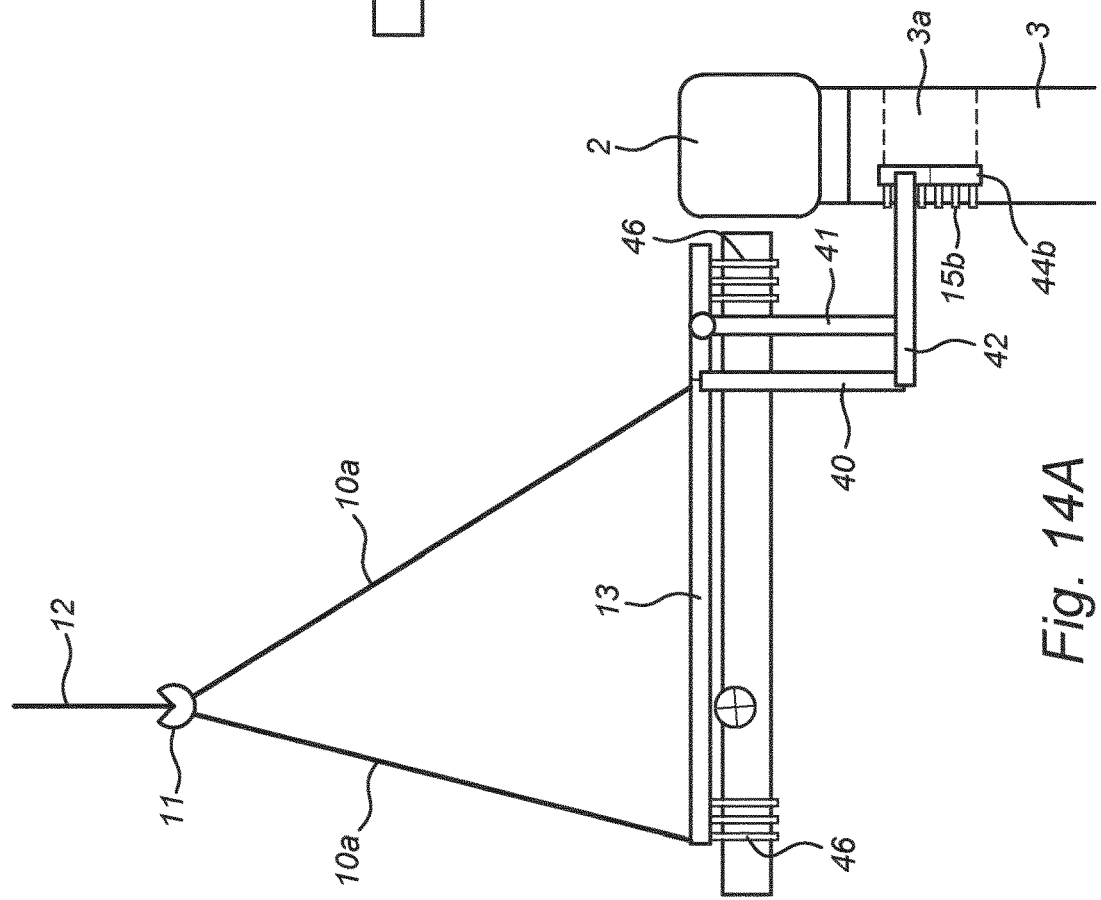

The wind turbine blade 5 is then taken up by the slings 46 and, as shown in FIGS. 13A and 13B, brought into the vicinity of a top part of a wind turbine tower 3, wherein engaging means 15 in the form of the support straps 15b are situated at the position of a peripheral part 3a of wind turbine tower 3 to be engaged. This position is also shown in FIG. 12C in perspective view, wherein the engaging means are shown as support rolls 15c. The peripheral part 3a is then engaged by support straps 15b, wherein guide frame 44 (44a, 44b, 44c) can if desired co-displace with relative movements of wind turbine blade 5 and the (stable) wind turbine tower 3 with some damping.

According to FIGS. 15A and 15B, the wind turbine blade is then moved in substantially horizontal or 3 o'clock position toward an opening 21 of the hub 20 of nacelle 2 and received and fixed therein, wherein support straps 15b continue to engage on wind turbine tower 3.

Referring to FIGS. 16A and 16B in a subsequent step of the method, once the connection has been made the slings 46 are removed and guide frame 44 and support straps 15b are detached from the periphery of wind turbine tower 3 and removed along the wind turbine blade 5 mounted on hub 20 of nacelle 2 using the crane.

Referring to FIGS. 17A-22A and FIGS. 17B-22B, different steps are shown of a method for placing a wind turbine blade 5 in a so-called 6 o'clock position on the nacelle 2 of a wind turbine on a wind turbine tower 3.

FIG. 17A shows a positioning tool which is suspended from hoisting cables 10a and the geometry of which is adapted to the stated objective. The positioning tool comprises an intermediate construction (13, 50, 51, 52, 53) which is suspended from hoisting cables 10a and which comprises a hoisting beam 13 to which a support beam 52 rotatable in a vertical plane around a hinge 53 is connected with interposing of two horizontally running support beams (50, 51). FIG. 17B shows a top view of the setup of FIG. 17A. The positioning tool further comprises a guide frame 54 (with side arms 54a and 54b connected to a transverse beam 54c) which is connected on one side to the intermediate construction (13, 50, 51, 52, 53) and is provided on another side with engaging means 15 in the form of a number of support straps 15b.

Device 1 is lowered with the crane (not shown) toward the wind turbine blade 5 and connected thereto using slings 46. The centre of gravity 50 of wind turbine blade 5 here lies approximately straight under the hoisting block 11, whereby wind turbine blade 5 is initially oriented in a substantially horizontal position.

Referring to FIGS. 18A and 18B, guide frame 54 is brought from the first angular position shown in FIGS. 17A and 17B into a second angular position by angle adjusting means 56 which are placed between support beams 50 and 52 and take the form of hydraulic cylinders (56a, 56b), wherein guide frame 54 forms an angle 59 of about 90° with the longitudinal direction of support beam 13. Engaging means 15 (15b) are now situated under wind turbine blade 5. FIG. 18B shows this position in a top view.

Figure 19C:
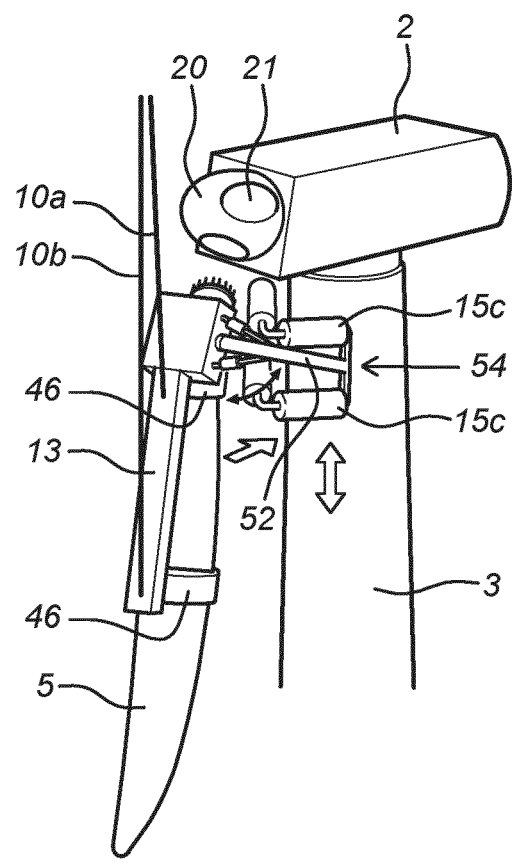
FIG. 19C is a schematic perspective view of a step of the embodiment of the invention shown in FIGS. 17A-22A.

Wind turbine blade 5 is then taken up by slings 46 and, as shown in FIGS. 19A and 19B, brought into a substantially vertical position and brought closer to a top part of a wind turbine tower 3, wherein engaging means 15 in the form of support straps 15b are situated at the position of a peripheral part 3a of wind turbine tower 3 to be engaged. This position is also shown in perspective view in FIG. 19C, wherein the engaging means are shown as support rolls 15c.

Figure 20B:
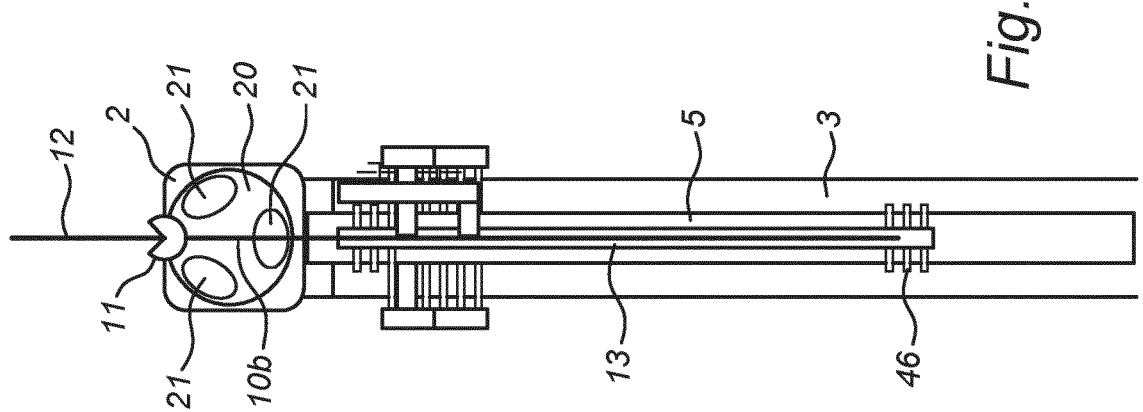
Figure 20A:
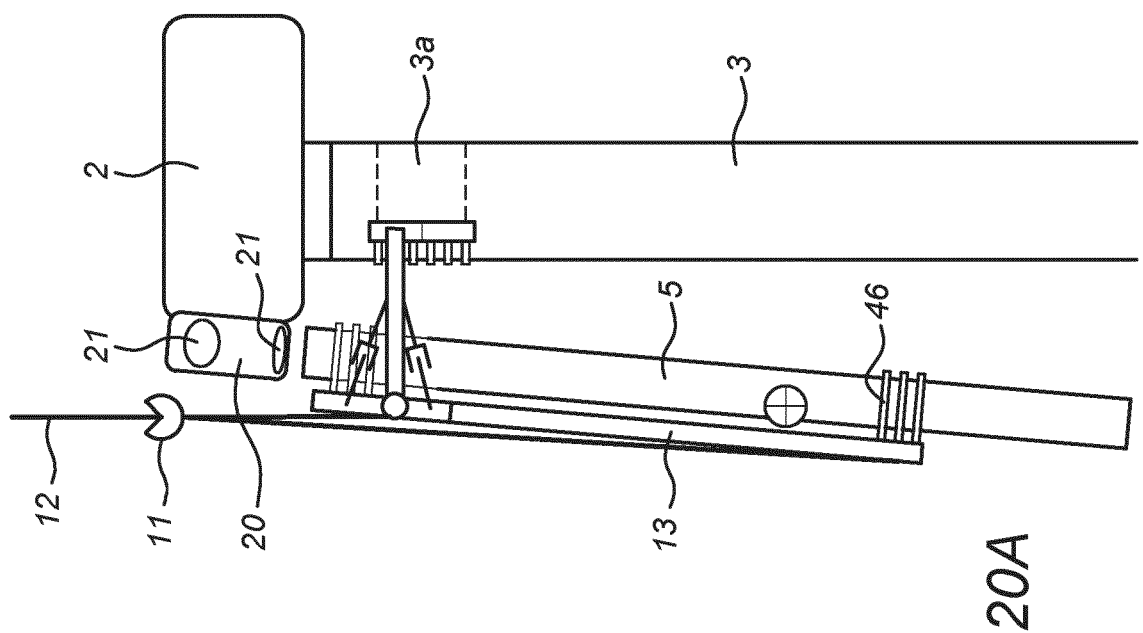

According to FIGS. 20A and 20B, peripheral part 3a is then engaged by support straps 15b, wherein guide frame 54 (54a, 54b, 54c) can if desired co-displace with relative movements of wind turbine blade 5 and the (stable) wind turbine tower 3 with some damping. FIG. 20B once again shows a front view of this position.

Figure 21B:
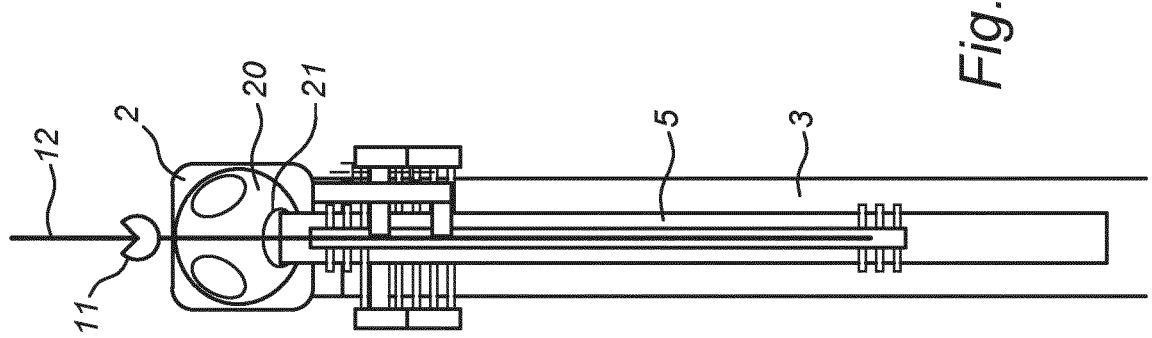
Figure 21A:
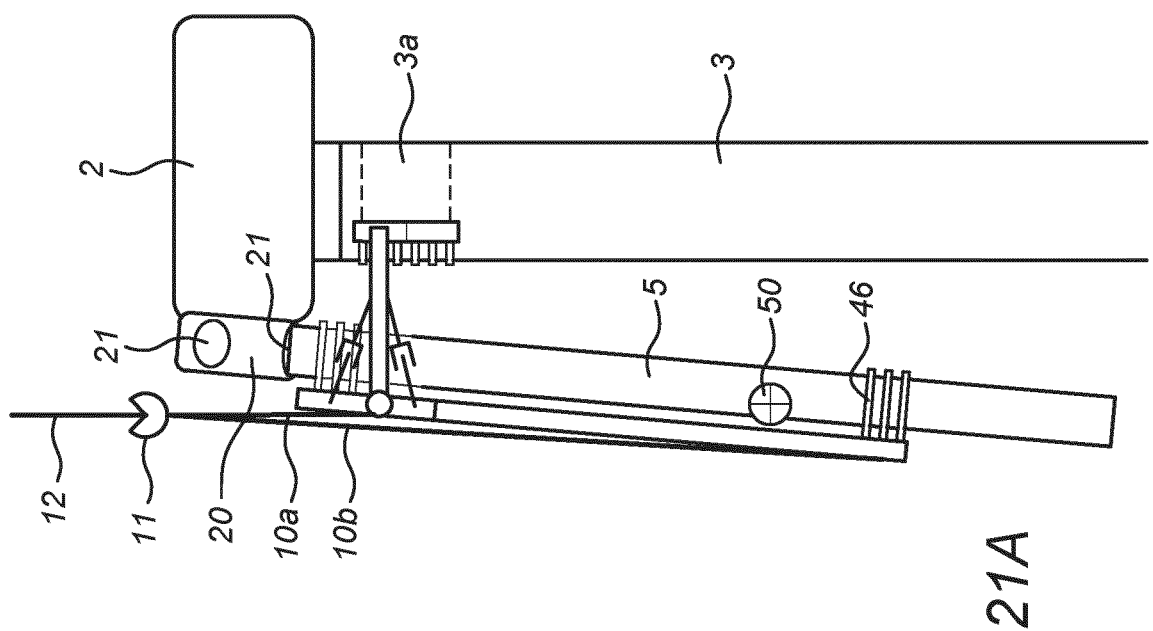

According to FIGS. 21A and 21B, wind turbine blade 5 is then moved in substantially vertical or 6 o'clock position toward an opening 21 of the hub 20 of nacelle 2 and received and fixed therein, wherein support straps 15b continue to engage on wind turbine tower 3.

Referring to FIGS. 22A and 22B in a subsequent step of the method, once the connection has been made the slings 46 are removed and guide frame 54 and support straps 15b are detached from the periphery of wind turbine tower 3 and removed along the wind turbine blade 5 mounted on the hub at 20 of nacelle 2 using the crane.

Referring to FIGS. 23A-25A and FIGS. 23B-25B, different steps are shown of a method for placing a rotor 6 of three wind turbine blades 5 on the nacelle 2 of a wind turbine on a wind turbine tower 3. A rotor 6 comprises a hub 20 in which three (or two, or more than three) wind turbine blades (5a, 5b, 5c) have already been arranged.

Figure 23B:
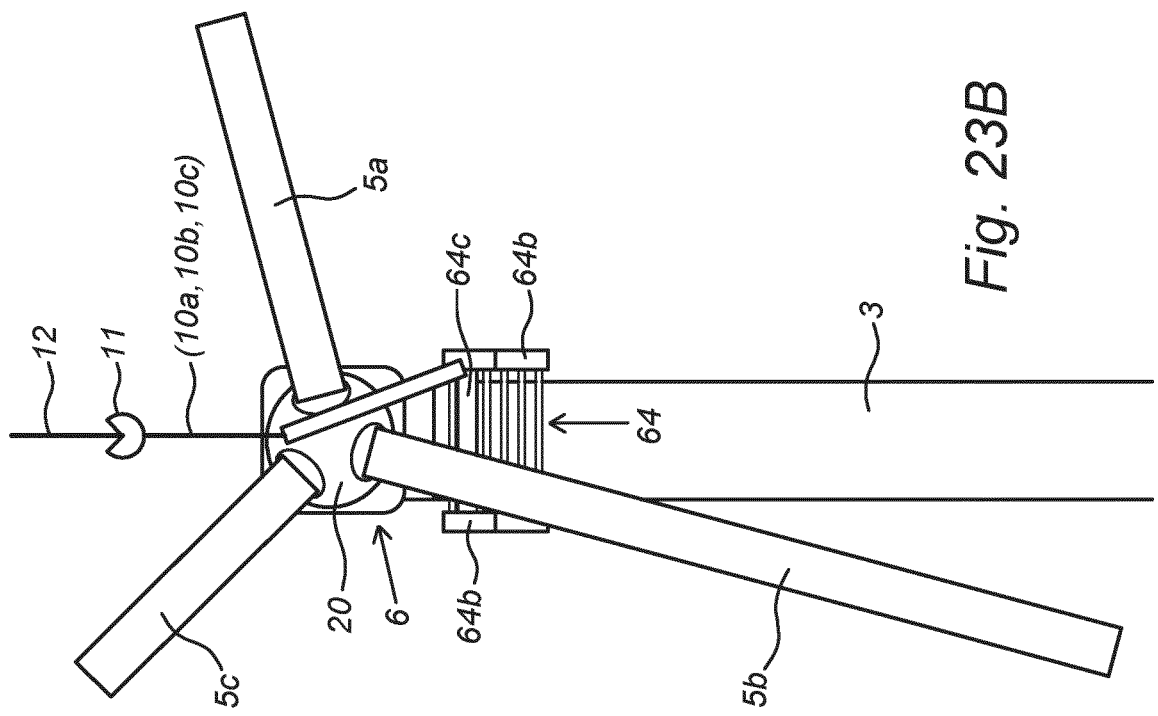
Figure 23A:
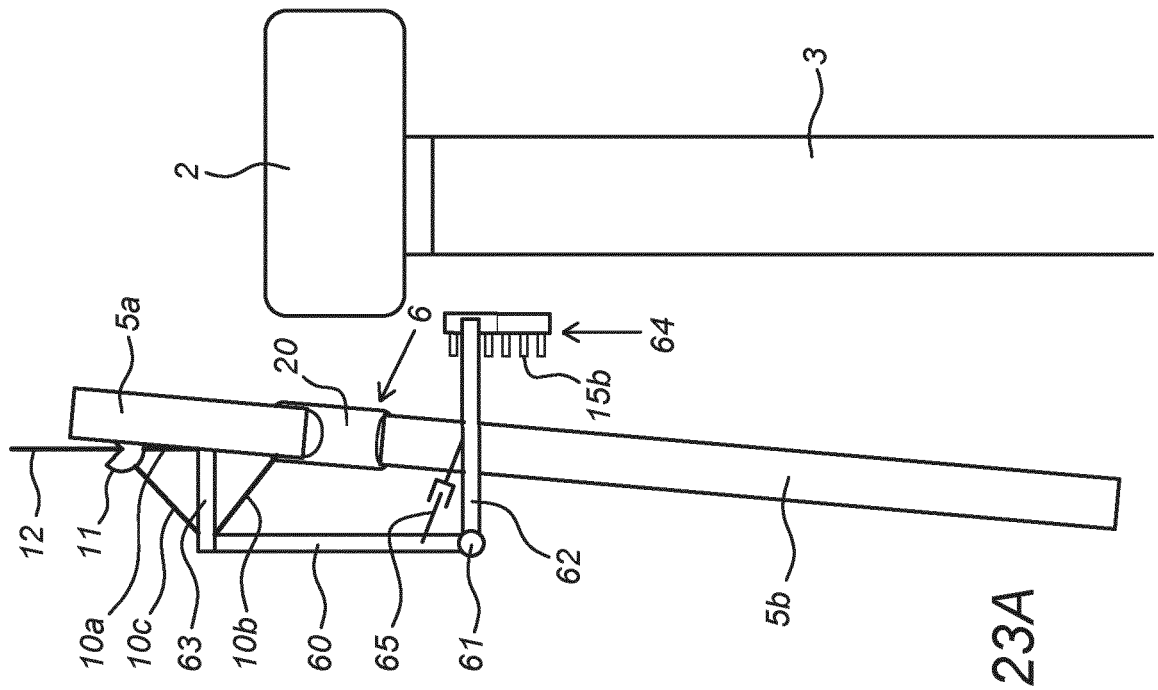
Figure 23C:
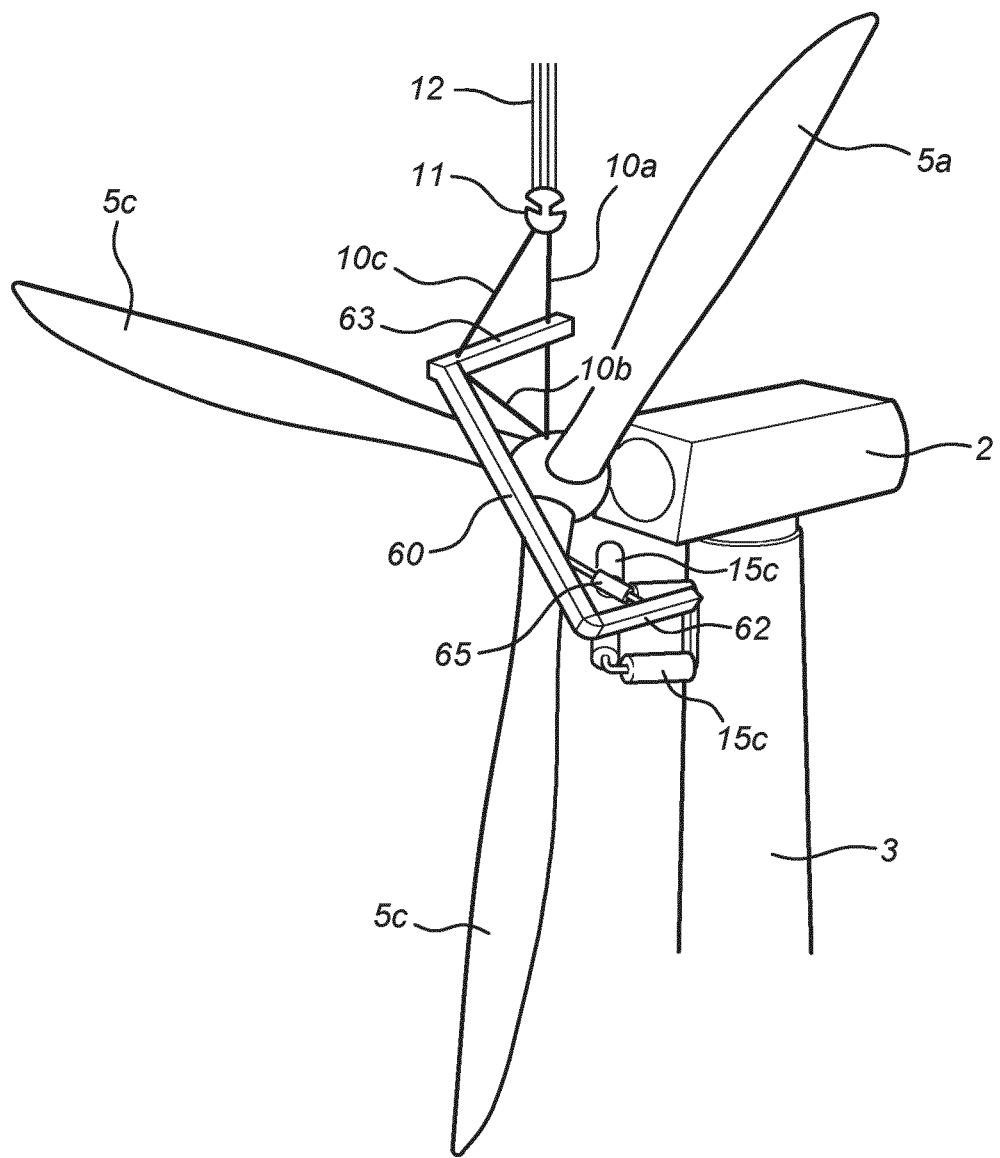
FIG. 23C is a schematic perspective view of a step of the embodiment of the invention shown in FIGS. 23A-25A.

FIG. 23A shows a positioning tool which is suspended from a hoisting cable 10 and the geometry of which is adapted to the stated objective. The positioning tool comprises an intermediate construction (60, 61, 62, 63) which is suspended from hoisting cables (10a, 10b, 10c) and which comprises a support beam 60 which is directed downward via the horizontal support beam 63 and to which is connected a support beam 62 rotatable in a vertical plane around a hinge 61. FIG. 23B shows a front view of the setup of FIG. 23A. The positioning tool further comprises a guide frame 64 (with side arms 64a and 64b connected to a transverse beam 64c) which is connected on one side to the intermediate construction (60, 61, 62, 63) and is provided on another side with engaging means 15 in the form of a number of support straps 15b. Optional angle adjusting means in the form of hydraulic cylinder(s) 65 can change and set the angular position of support beam 62 relative to the horizontal direction, if desired. FIG. 23C shows the position shown in FIGS. 23A and 23B, but in perspective view. The engaging means are here also embodied as support rolls 15c. It is further noted that the horizontal support beam 63 is suspended with hoisting cables (10a, 10b, 10c) such that the hoisting cables (10a, 10b, 10c) form a triangle. The suspension of the intermediate construction (60, 61, 62, 63) can hereby absorb a moment of force, at least to a certain extent.

Device 1 is lowered with the crane (not shown) toward the rotor 6 and connected thereto by attaching the hoisting cables (10a, 10b, 10c) to hub 20. This position is shown in FIGS. 23A and 23B, wherein rotor 6 has been brought into the vicinity of a top part of a wind turbine tower 3, wherein the engaging means 15 in the form of support straps 15b are situated at the position of a peripheral part 3a of wind turbine tower 3 to be engaged.

Referring to FIGS. 24A and 24B, peripheral part 3a is engaged by support straps 15b, wherein the guide frame 64 (64a, 64b, 64c) can if desired co-displace with relative movements of the rotor 6 and the (stable) wind turbine tower 3 with some damping. FIG. 24B once again shows a front view of this position. According to FIGS. 24A and 24B, rotor 6 is then moved with hub 20 to nacelle 2 and fixed thereon, wherein support straps 15b or support rolls 15c continue to engage on wind turbine tower 3.

Referring to FIGS. 25A and 25B in a subsequent step of the method, once the connection has been made the hoisting cables (10a, 10b, 10c) are detached from rotor 6, and guide frame 64 and support straps 15b are detached from the periphery of wind turbine tower 3 and removed along the rotor 6 mounted on nacelle 2 using the crane.

The invention claimed is:

1. A device for placing a component of a wind turbine on a wind turbine tower, the device comprising a positioning tool that is coupled to a hoisting cable of a hoisting means and that is configured to place the component while being suspended from the hoisting cable, wherein the positioning tool comprises a hoisting frame or yoke configured for taking up both the component and a guide frame at the same time, wherein the guide frame is coupled to the hoisting frame or yoke, and configured to temporarily engage a peripheral part of the wind turbine tower while allowing a rotational movement and a longitudinal movement of the guide frame with respect to a longitudinal axis of the wind turbine tower during engagement, wherein the hoisting frame or yoke is configured to be coupled to the hoisting cable, and wherein the guide frame is coupled on one side of it to the hoisting frame or yoke and via the hoisting frame or yoke to the hoisting cable, and the guide frame is on another side than the one side of it provided with engaging means configured for temporarily engaging the peripheral part of the wind turbine tower and connecting a taken-up component to the wind turbine tower while allowing a rotational movement and a longitudinal movement of the guide frame with respect to the longitudinal axis during engagement and reducing relative movements of the taken-up component relative to the wind turbine tower.

2. The device according to claim 1, wherein the suspension of the hoisting frame or yoke from the hoisting cable is able to absorb a moment of force.

3. The device according to claim 1, wherein the guide frame is pivotally coupled on the one side to the hoisting frame or yoke, and the guide frame can be brought into different angular positions relative to the hoisting frame or yoke using angle adjusting means.

4. The device according to claim 3, wherein the angle adjusting means are configured to move the guide frame between angular positions relative to the hoisting frame or yoke with damping.

5. The device according to claim 3, wherein the angle adjusting means are configured to hold the guide frame in a fixed angular position relative to the hoisting frame or yoke.

6. The device according to claim 3, wherein the angle adjusting means comprise at least one spacer arranged between the hoisting frame or yoke and the guide frame, which spacer is variable in length and thus varies the angular position between the hoisting frame or yoke and the guide frame.

7. The device according to claim 6, wherein the at least one spacer comprises a hydraulic, pneumatic and/or electric cylinder.

8. The device according to claim 1, wherein the engaging means are configured to engage a peripheral part extending through a peripheral angle≤180° of the periphery of the wind turbine tower.

9. The device according to claim 1, wherein the engaging means are configured to engage a peripheral part extending through a peripheral angle >180° of the periphery of the wind turbine tower, and preferably extends over substantially the whole periphery.

10. The device according to claim 1, wherein the engaging means are selected from bumpers, rolls, wheels, caterpillar tracks, suction cups and support straps, and combinations thereof.

11. The device according to claim 1, wherein the component of the wind turbine comprises a nacelle, a wind turbine blade and/or a rotor.

12. The device according to claim 1, wherein the positioning tool is supported through the guide frame by the wind turbine tower to stably place the component on the wind turbine tower to reduce the amount of relative movements between the component and the wind turbine tower.

13. The device according to claim 12, wherein the engagement means engage the peripheral part of the wind turbine tower to prevent movement of the guide frame during engagement in a blocked direction orientated from the engagement means towards the wind turbine tower, as well as a rotation about an axis in an equal cross-sectional plane of the wind turbine tower as the blocked direction.

14. The device according to claim 2, wherein the engagement means cover a distance in the longitudinal direction of the wind turbine tower on the wind turbine tower that is sufficient to absorb the moment of force.

15. The device according to claim 14, wherein the distance is at most 20% of a height of the wind turbine tower.

16. The device according to claim 1, wherein the device comprises auxiliary means, configured for rotating the guide frame while being suspended from the hoisting cable.

17. The device according to claim 16, wherein the auxiliary means are a tugger winch with a tag line configured to control the component during placement of the component.

18. The device according to claim 1, wherein the engaging means comprise elastic material to provide flexibility between the engaging means and the wind turbine tower during engagement.

19. The device according to claim 1, wherein the engaging means engage a top part of the wind turbine tower of a longitudinal part of the wind turbine water above a sea surface.

20. The device according to claim 19, wherein the top part is at most 50% of a length of the wind turbine tower.

* * * * *